(No Model.)  12 Sheets—Sheet 1.

F. N. BREWER.
SALES RECORDING APPARATUS.

No. 565,133.  Patented Aug. 4, 1896.

WITNESSES:
N. E. Paige
F. Norman Dixon

INVENTOR:
F. N. Brewer
By his Attorneys
Wm. C. Strawbridge
J. Bonsall Taylor (No Model.) 12 Sheets—Sheet 2.
F. N. BREWER.
SALES RECORDING APPARATUS.

No. 565,133. Patented Aug. 4, 1896.

WITNESSES:
N. E. Paige
F. Norman Dixon

F. N. Brewer,
INVENTOR:
By his Attorneys,
Wm. E. Strawbridge
J. Bonsall Taylor.

(No Model.)
F. N. BREWER.
SALES RECORDING APPARATUS.
No. 565,133.      Patented Aug. 4, 1896.
12 Sheets—Sheet 3.
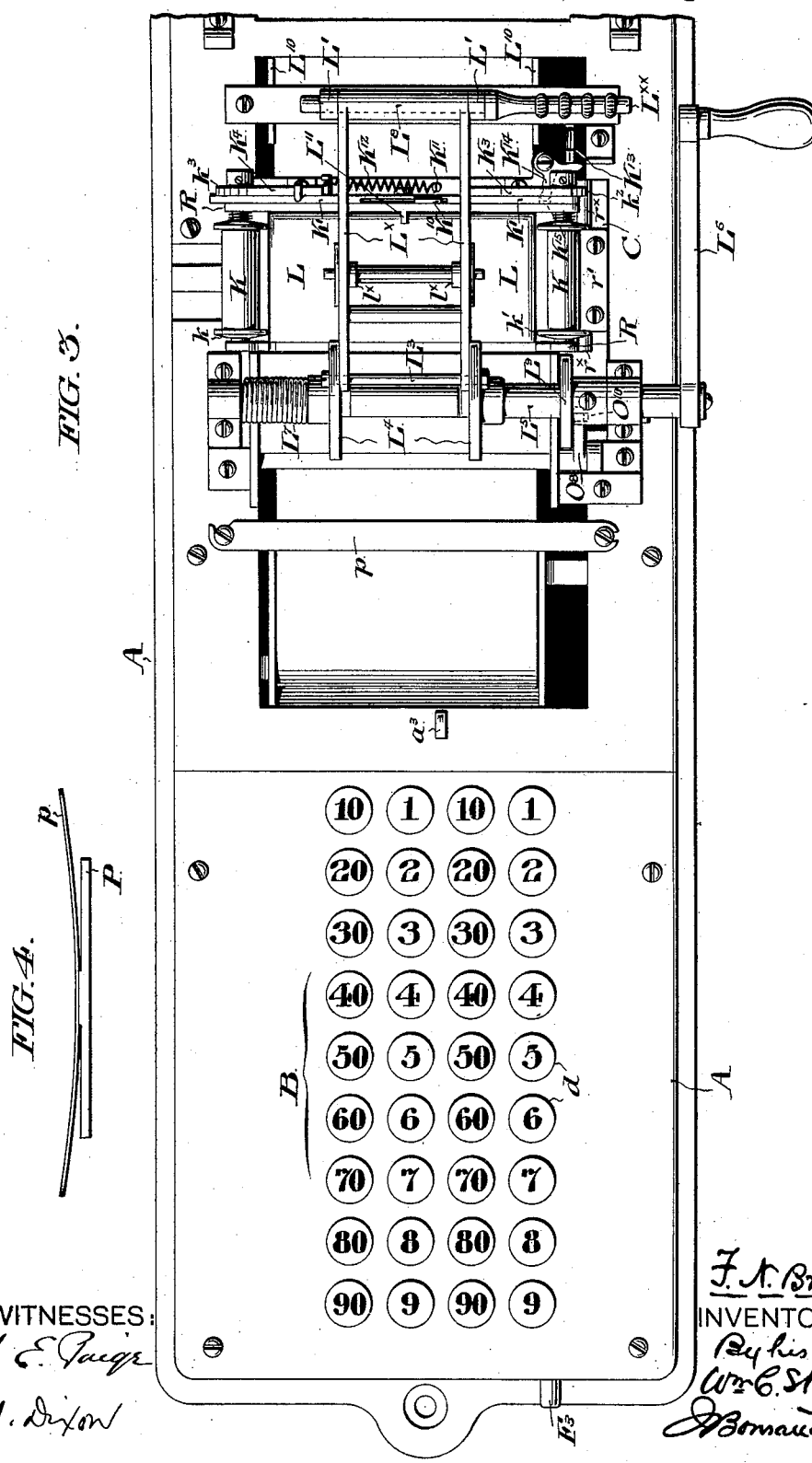
WITNESSES:
N. E. Paige
F. N. Dixon
INVENTOR:
F. N. Brewer
By his Attorneys
Wm. C. Strawbridge
Bowman Taylor (No Model.) 12 Sheets—Sheet 4.

F. N. BREWER.
SALES RECORDING APPARATUS.

No. 565,133. Patented Aug. 4, 1896.

WITNESSES:
N. E. Paige
F. N. Dixon

INVENTOR:
F. N. Brewer,
By his Attorneys
Wm. C. Strawbridge
J. Bonsall Taylor (No Model.) 12 Sheets—Sheet 5.

F. N. BREWER.
SALES RECORDING APPARATUS.

No. 565,133. Patented Aug. 4, 1896.

WITNESSES:
N. E. Paige
F. Norman Dixon

INVENTOR:
F. N. Brewer,
By his Attorneys
Wm. E. Strawbridge
J. Bonsall Taylor (No Model.) 12 Sheets—Sheet 6.

F. N. BREWER.
SALES RECORDING APPARATUS.

No. 565,133. Patented Aug. 4, 1896.

WITNESSES:
N. E. Paige
F. Norman Dixon

F. N. Brewer,
INVENTOR:
By his Attorneys,
Wm. C. Strawbridge
D. Bonsall Taylor (No Model.) 12 Sheets—Sheet 7.
F. N. BREWER.
SALES RECORDING APPARATUS.

No. 565,133. Patented Aug. 4, 1896.

WITNESSES:
N. E. Paige
J. Norman Dixon

INVENTOR:
F. N. Brewer,
By his Attorneys,
Wm. C. Strawbridge
J. Bonsall Taylor (No Model.) 12 Sheets—Sheet 9.

F. N. BREWER.
SALES RECORDING APPARATUS.

No. 565,133. Patented Aug. 4, 1896.

WITNESSES:

INVENTOR:
F. N. Brewer,
By his Attorneys, (No Model.)  12 Sheets—Sheet 10.

F. N. BREWER.
SALES RECORDING APPARATUS.

No. 565,133.  Patented Aug. 4, 1896.

WITNESSES:
N. E. Paige
J. Norman Dixon

F. N. Brewer,
INVENTOR:
By his Attorneys
Wm C Strawbridge
J Bonsall Taylor (No Model.) 12 Sheets—Sheet 11.

F. N. BREWER.
SALES RECORDING APPARATUS.

No. 565,133. Patented Aug. 4, 1896.

WITNESSES:
N. E. Paige
F. N. Dixon

INVENTOR:
F. N. Brewer
By his Attorneys,
Wm C. Strawbridge
J. Bonsall Taylor

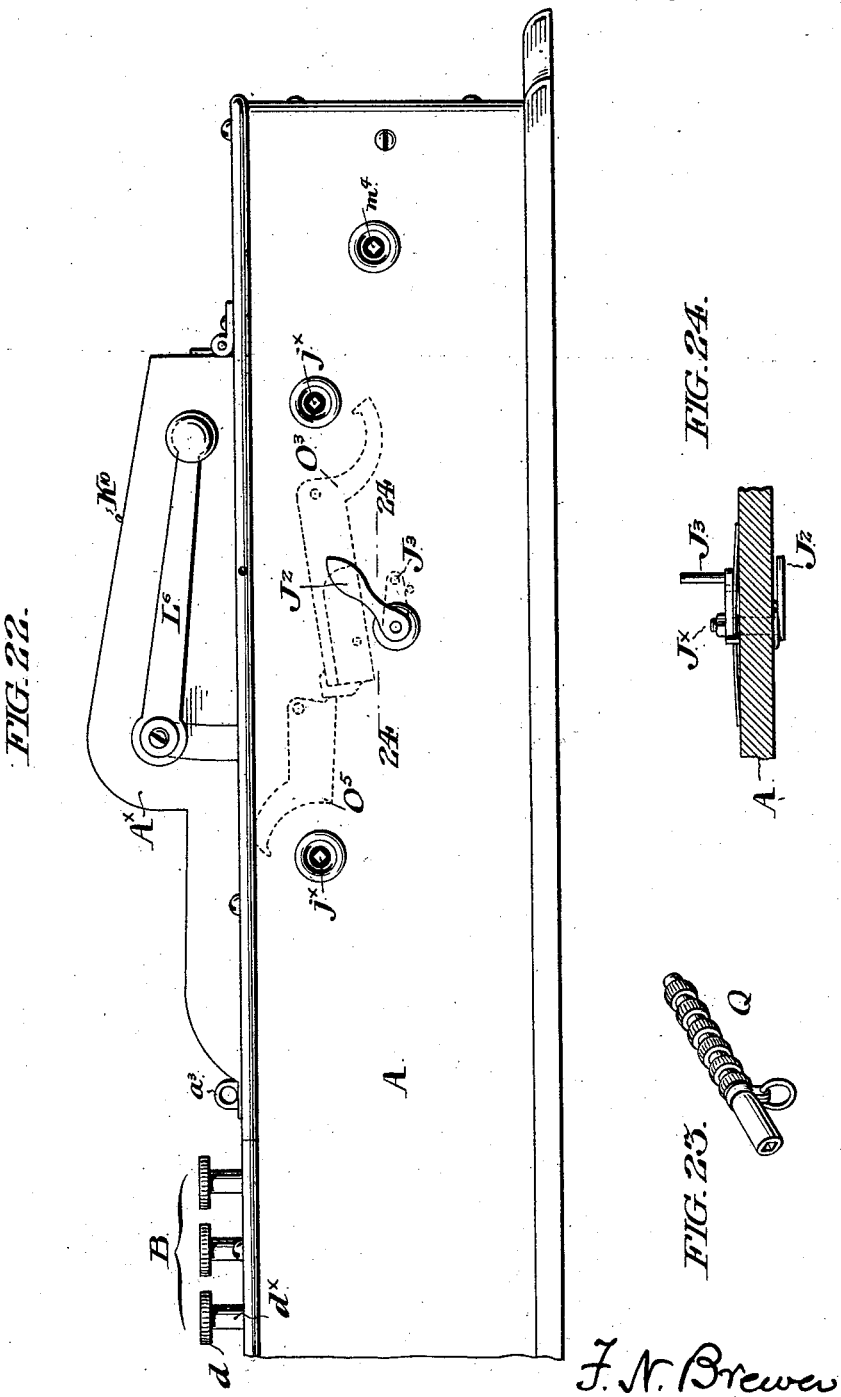

UNITED STATES PATENT OFFICE.

FRANKLIN N. BREWER, OF PHILADELPHIA, PENNSYLVANIA.

SALES-RECORDING APPARATUS.

SPECIFICATION forming part of Letters Patent No. 565,133, dated August 4, 1896.

Application filed February 12, 1896. Serial No. 579,100. (No model.)

*To all whom it may concern:*

Be it known that I, FRANKLIN N. BREWER, a citizen of the United States, residing in the city and county of Philadelphia, in the State of Pennsylvania, have invented certain new and useful Improvements in Sales Recording Machines, of which the following is a specification.

In the conduct of large retail establishments, it is usual for all moneys received by the salespeople in each transaction or sale, to be transmitted by automatic cash carriers or otherwise to a cashier, together with a memorandum of the amount of the sale, the number or other designation of the salesperson, and a description of the goods sold. The cashier upon receiving the memorandum and money, examines the memorandum, stamps or marks upon it a suitable indorsement, and, after making a record of the same, returns the memorandum with any required change, to the salesperson, to be delivered to the purchaser.

The record of the transaction made or taken by the cashier may be either a transcript manually copied from the memorandum itself,—or, the original memorandum may be made in duplicate by the salesperson and transmitted to the cashier, who may return one of the copies to the salesperson, and retain the other as the required record.

However this may be, the system indicated requires the making and keeping of a record by the cashier, and as such records have heretofore been made they have been in handwriting, often hastily made, and presenting more or less difficulty by reason of illegibility and uncertainty, to the auditor who passes upon or audits said record.

The object of my invention is the provision of a machine to be used by a cashier, in making the required continuous and permanent record of the individual sales as the same are reported, and in and by the same operations by which records are made contemporaneously printing upon the sales slip received from the salesperson, the amount of the sale and the date of the transaction, or other selected memoranda, the machine elements being so combined and arranged that the operation described may be performed by such simple and obvious manipulation of the apparatus that practically no preliminary training or practice on the part of the operator is required.

In the accompanying drawings I show and herein I describe a good form of a convenient embodiment of my invention, the particular subject matter claimed as new being hereinafter definitely specified.

In the accompanying drawings:

Figure 3 is a fragmentary top plan view of the apparatus the cover plate $A^\times$ being supposed removed.

Figure 4 is a view of a tension device by which the unwinding of the record slip from the reel $m$ is retarded.

Figure 9 is a fragmentary view in side elevation of the apparatus the side wall nearest the eye being supposed removed to exhibit the interior arrangement.

Figure 10 is a top plan view of one of the thrust bars $B^\times$ and the bell crank lever $B'$ associated in operation with it.

Figure 22 is a fragmentary view in side elevation of the apparatus the side wall nearest the eye being shown in position.

Figure 23 is a view in perspective of a key.

Figure 24 is a longitudinal fragmentary sectional plan of a portion of the wall nearest the eye in Figure 2 section being supposed on the dotted line 24—24.

Similar letters of reference indicate corresponding parts.

Figure 1:
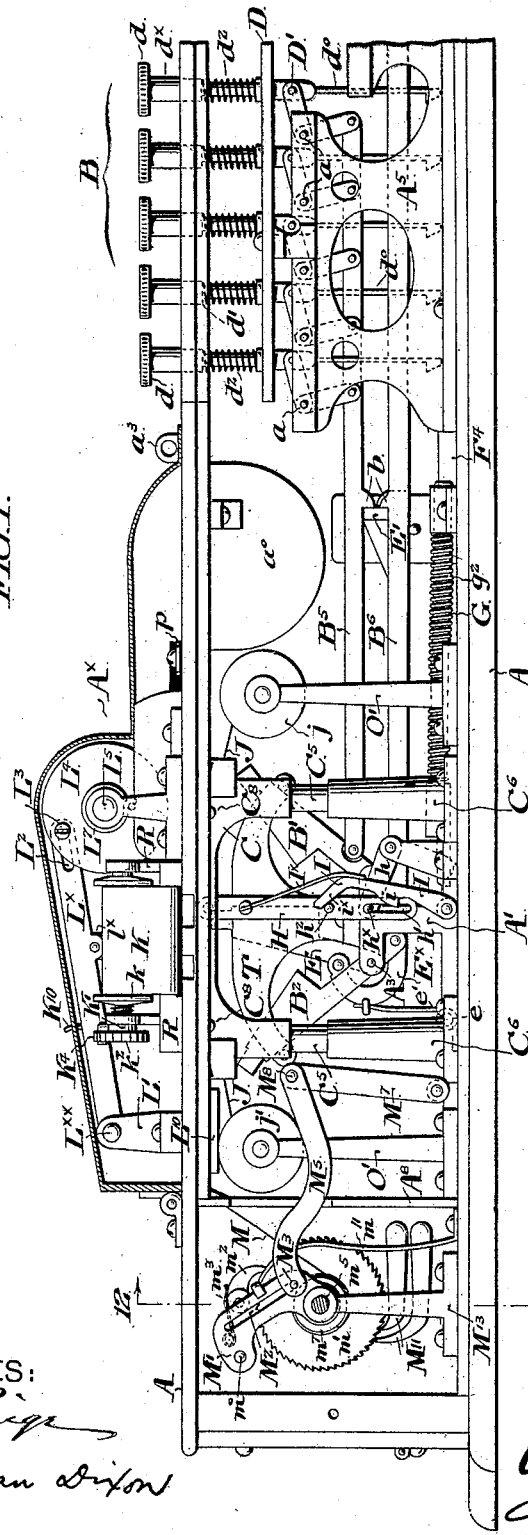
Figure 1 is a fragmentary view in side elevation of my improved apparatus, the side walls of the casing being supposed removed to exhibit the interior arrangement and certain of the parts being omitted for clearness of illustration.

In the preferred embodiment of my invention depicted in the accompanying drawings and herein described, a fillet of blank paper passes from an unwinding roll between a platen and a line of assembled type, and is, as fast as it receives its imprint, automatically wound upon a winding roll, from which latter the accumulated roll of duly printed paper, constituting a record, may, with its roll, be removed at will. As each sale is reported to the cashier, the latter assembles suitable type with which the machine is provided, to express the amount of the sale in dollars and cents, and, by throwing a lever, occasions the contact of said type through an inking ribbon with the paper to make the imprint, as hereinafter described, and the machine is so organized that the reverse movement of the parts concerned in the making of said imprint, automatically permits or occasions the performance of several concomitant operations, viz: the scattering or distribution of the type, the advance of the record strip, and the longitudinal shifting of the inking ribbons.

I now proceed to describe the arrangement of the type and of the type manipulating contrivances, with which my apparatus is provided.

My apparatus is provided with a bank of keys, each of which keys controls a machine type block having a printing-face corresponding to a number or symbol engraved printed or otherwise marked upon said key, and said keys are arranged in a series of rows, four rows of nine keys each being shown, extending from front to rear of the bank,—and is also provided with a movable chase through apertures in which said machine type blocks, when in operative position, and when the chase is depressed as hereinafter described, extend, to make contact with the record strip. The said movable chase embodies a number of type apertures corresponding to the number of rows of keys composing the bank referred to,—namely, four,—the arrangement being such that any one, but not more than one at a time, of the series of nine machine type blocks described as controlled respectively by the nine keys of a given row, may be, by the manipulation of the appropriate key, placed in operative position in alinement with a type aperture in the movable chase common to all the type blocks controlled by the keys constituting said given row,—and three other selected machine type blocks, controlled respectively each by one of the keys of the other rows, may be placed in operative position in alinement each with one of the remaining three type apertures in the movable chase, and thereupon an impression may be taken from the four assembled machine type blocks, by the mechanism hereinafter described, upon the record strip.

The arrangement of markings upon the keys is as follows:

Keys of the first row, beginning at the left of the bank, bear the numerals, "10" "20" "30" "40" "50" "60" "70" "80" and "90" respectively; the keys of the second row bear the numerals "1" "2" "3" "4" "5" "6" "7" "8" and "9" respectively; the keys of the third row bear the numerals "10" "20" "30" "40" "50" "60" "70" "80" and "90" respectively; and the keys of the fourth row bear the numerals "1" "2" "3" "4" "5" "6" "7" "8" and "9" respectively.

The nine machine type blocks controlled by the keys of each row or tier of keys, are provided with printing faces which are adapted to print the numerals "1," "2," "3," "4," "5," "6," "7," "8," and "9," respectively, the four sets of machine type blocks being identical with each other.

It may be stated at this point, that when in assembling a row of type blocks to make a record or entry upon the record sheet, the amount to be printed does not call for a numeral in any particular column of the record sheet, no key in the row of keys corresponding to that column is manipulated, and the machine thereupon, when the imprint is made, prints a cipher in said column,—machine type blocks bearing ciphers being always, and until replaced by machine type blocks bearing numerals of value, normally in operative position in alinement with the type apertures in the movable chase.

The printing faces of the machine type blocks are substantially the same as the markings upon the respective keys with which they are connected, and may be exactly similar. In practice, however, for the greater convenience of the operator, the keys controlling the first and third rows of machine type blocks, and which machine type blocks carry the numerals "1" to "9" inclusive, as stated,—bear, as shown, the designations "10" to "90" inclusive. Therefore, when it is desired to express the value "10.25" the operator touches the first key of the first row; bearing the numeral "10;" no key in the second row: touches the second key in the third row; and touches the fifth key in the last row. Although no key of the second row was touched, a cipher will, as explained, be printed in the second column of the record sheet.

A is the frame work or casing of the machine, the same being conveniently formed as a box like structure, affording protection and support to the assemblage of working parts which in their entirety constitute my apparatus.

A' A' are a pair of T-shaped supports erected from the base of the machine at opposite sides of the same, which serve to support in parallelism a pair of pivot bars $A^2 A^3$ transversely extending across the machine beneath the movable chase C.

$B'$ $B^2$ are a series of machine type blocks, corresponding in number with the aggregate of the keys in the bank, the series $B'$ being pivotally mounted upon the pivot bar $A^2$ and the series $B^2$ being pivotally mounted upon the pivot bar $A^3$.

Each of the machine type blocks is provided at its upper end with a printing face, and the blocks of both series, which are all of the same outline, are each provided as to their inner faces with a shoulder adapted, when a block is thrown into operative position, to rest upon a supporting bar $B^3$ extending from one support A' to the other. When the type blocks are thrown into operative position, their shoulders, resting on the supporting bar, support and maintain the printing faces accurately in registry with the type apertures in the movable chase.

$B^5$ are a series of thrust bars corresponding in number to the number of machine type blocks $B'$, mounted horizontally and in parallelism in the machine, and free for limited longitudinal movement, the inner end of each bar being pivotally connected to one of the blocks $B'$ at a point above the pivot bar $A^2$.

$B^6$ are a corresponding series of thrust bars corresponding in number to the number of blocks $B^2$, mounted horizontally and in parallelism with the machine, in a plane beneath that of the bars $B^5$, and, similarly to said bars $B^5$, free for limited longitudinal movement. The inner end of each bar $B^6$ is pivotally connected to one of the blocks $B^2$ at a point below the pivot bar $A^3$.

I represent the operating keys, B, as arranged in rows and provided with markings, as hereinbefore described.

Figure 2:
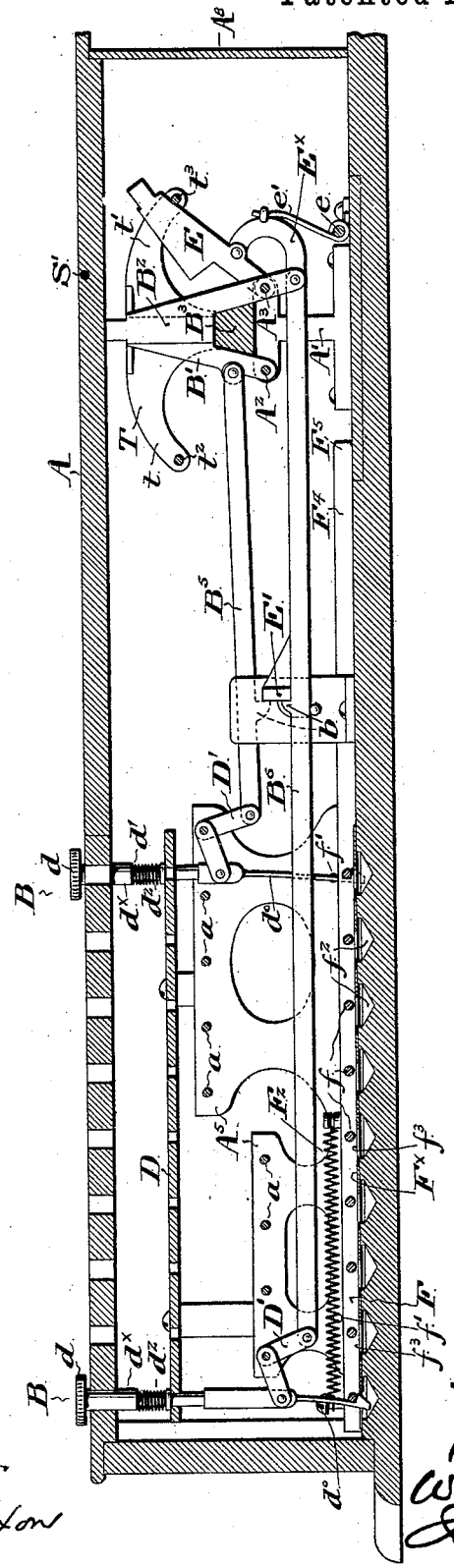
Figure 2 is a fragmentary longitudinal vertical sectional elevational view of the casing with certain of the parts shown as mounted therein the remaining parts not shown being omitted for clearness of illustration.

Each key consists of a disk like head $d$ and a depending shank $d^\times$, Figures 1, 2, and 9, of any preferred proportions and construction. The shanks of the keys extend through suitable apertures in the top wall or plate of the machine and through corresponding apertures in registry therewith in a plate D supported below and in parallelism with said top plate. Each shank is provided with a shoulder $d'$ and is surrounded by a spiral push spring $d^2$ which bears as to its upper extremity against said shoulder and as to its lower end against the plate D and said springs by their expansive thrust tend to maintain the keys normally in their protruding position.

Each key shank is connected by a bell crank lever D' with one of the thrust bars, through which levers vertical downward movement of said keys occasions endwise inward thrust or movement of said thrust bars in a direction away from the keys.

To support the levers D' in position I provide a pair of supporting plates $A^5 A^6$ at opposite sides of the machine. (Figures 1, 2, and 9,) and a series of nine pivot bars $a$ extending across the machine from the plate $A^5$ to the plate $A^6$, and mount said levers D' upon said bars, four of said levers being, in the organized machine, as illustrated, mounted upon each bar. The pivot bars $a$ which support the bell crank levers connected to the series of thrust bars $B^5$ of course occupy a higher level than those which support the bell crank levers connected to the series of thrust bars $B^6$.

Mounted upon the pivot bar $A^3$ at equi-distant intervals throughout its length are four type carrying blocks, E, (Figures 2, 6, and 11,) of substantially the same outline as the type carrying blocks hereinbefore described, each provided with a printing face adapted to make a cipher imprint, and which I therefore term cipher blocks.

$E^\times$ are four thrust bars, which I term the cipher thrust bars, approximately half the length of the thrust bars $B^5 B^6$, and disposed or interspersed among the thrust bars $B^6$, at intervals corresponding to the distances apart of the cipher type blocks, and provided at their inner ends with upwardly curved extensions which make pivotal connections each with one of said cipher type blocks intermediate of the height of the latter. The outer end of each of the cipher thrust bars is provided with a foot E', disposed between and extending transversely of the two sets of thrust bars for a distance equal to one quarter of the transverse space occupied by the whole number of thrust bars, so that each foot E' lies abreast of all the thrust bars connected with one row of keys of a bank. The lower edge of each thrust bar of the series $B^5$ and the upper edge of each thrust bar of the series $B^6$ are provided with cipher projections $b$, the series of which cipher projections exist in close proximity to the outer or acting surfaces of the feet of the cipher thrust bars, the arrangement being such that all the thrust bars of both series are through their cipher projections in contact with the foot of one or another of the cipher thrust bars.

$e$ is a spring carrying bar extending across the machine in the region of but below the type carrying blocks, upon which are mounted a series, $e'$, of four spiral springs, (Figures 2, 5, and 11,) all of which four springs have free upwardly projecting ends engaged respectively one with each of the cipher thrust bars $E^\times$, and tend to force said thrust bars outward to carry their feet E' into contact with the cipher projections $b$ of the thrust bars, and to maintain the four cipher blocks E tilted forward in operative position beneath the four type apertures in the movable chase C.

When then, as will be understood, a key in a particular row is depressed, the longitudinal movement imparted, through the bell crank D', to the thrust bar associated in operation with it, occasions, first, through its cipher projection, and through the cipher thrust bar, the throwing rearwardly and out of operative position, against the stress of the spring $e'$, of the cipher type block, the foot E' of the cipher thrust bar $E^\times$ of which is in contact with the cipher projections of all of the thrust bars of all of the keys in the same row with the selected key depressed, and, second, occasions the throwing forward and into approximately vertical operative position, with its shoulder in rest upon the bar $B^3$, the particular machine type block to which said thrust bar connected with the key depressed, is itself connected.

Figures 6, 7:
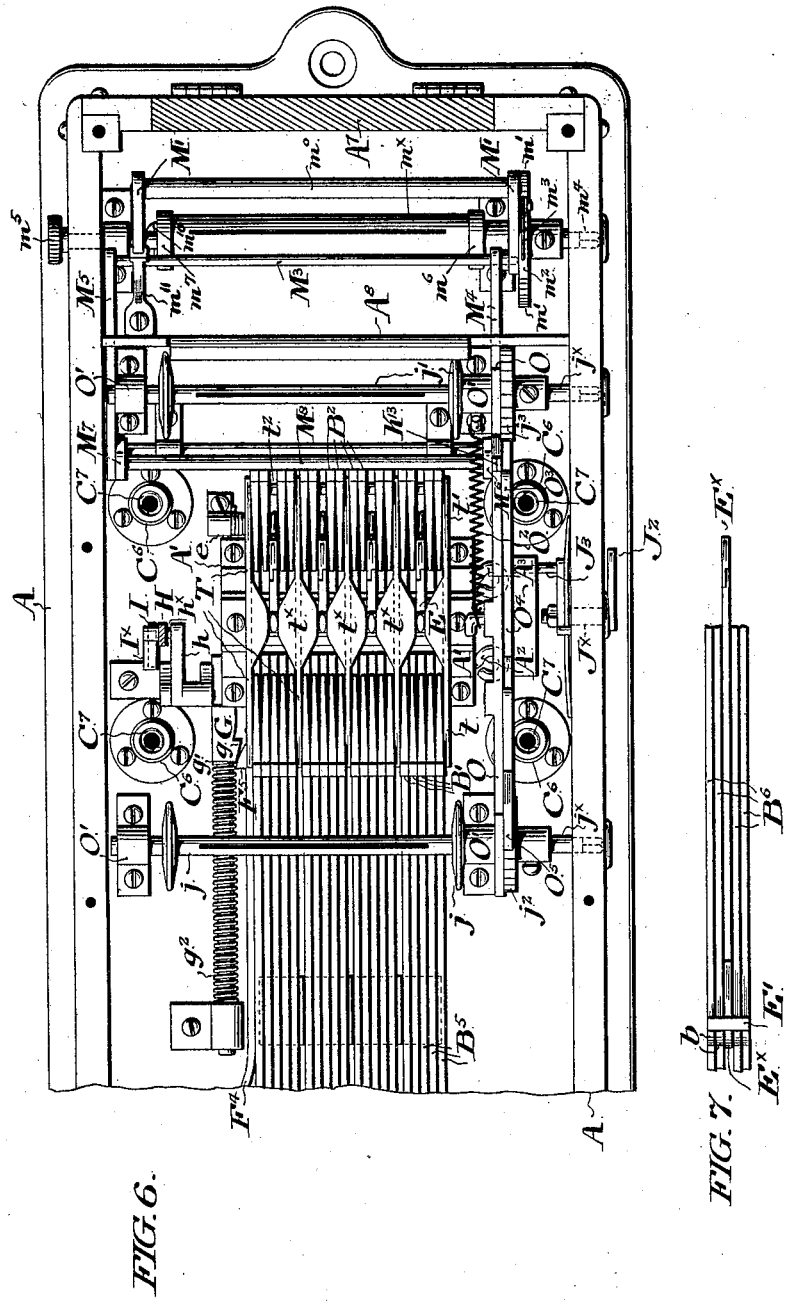
Figure 6 is a fragmentary plan view of the machine the top of the casing being supposed removed to exhibit the arrangement of the parts illustrated.
Figure 7 is a top plan view of a group of thrust bars.

T, Figures 1, 2, and 6 are a series of vertical plates erected, at equidistant intervals across the breadth of the machine, upon the block $B^3$, said plates having ears $t$ $t'$ extending toward the front and rear of the machine. $t^2$ is a bar extending transversely of the machine and engaged with all the ears $t$, and $t^3$ is a corresponding bar engaged with the ears $t'$.

The top edges of the plates are provided with deflecting plates, $t^\times$, which are lozenge shaped in plan, forming passage or guide ways between them, which passages are wide at their open extremities and narrow at their central portions. The plates $t^\times$ are so spaced apart that the central portions of the passage or guide ways between each pair of adjacent plates is just wide enough to admit a single type block, while the ends or mouths of the passage or guide ways are of breadth equal to the transverse space occupied by five thrust bars.

The three intermediate plates T are so disposed that each separates a group of thrust bars associated with one row of keys from the bars associated with the adjacent rows of keys, with the result that each of the guide or passage ways is common to all the thrust bars and type blocks associated with a given row of keys. When, then, any key of a row is depressed, the corresponding type block will in being thrown encounter the edge of one or the other of the plates $t^\times$ and be guided to a position in the waist or narrowest portion of the passage way,—the narrow portions of the several guide ways being in registry with the openings in the movable chase.

The type blocks are so loosely mounted on the bars to which they are pivotally connected, that they are free to move sidewise thereupon and to thus be deflected into central position by the edges of the plates $t^\times$.

The type blocks when not in operative position, rest against said rods $t^2$ and $t^3$, as shown in Figure 2.

As hereinbefore described, in the operation of my machine, an entire line of four type blocks may be assembled before the impression is taken, and therefore, after the appropriate keys, one in each row, are depressed, to throw, through the bell cranks and thrust bars, the four or less number of type blocks into position for operation, with their shoulders resting on the supporting bar $B^3$, mechanism is necessary to maintain the type blocks, the manipulation of which has just been described, in operative position pending the taking of the impression, and such mechanism I now proceed to describe.

Figure 5:
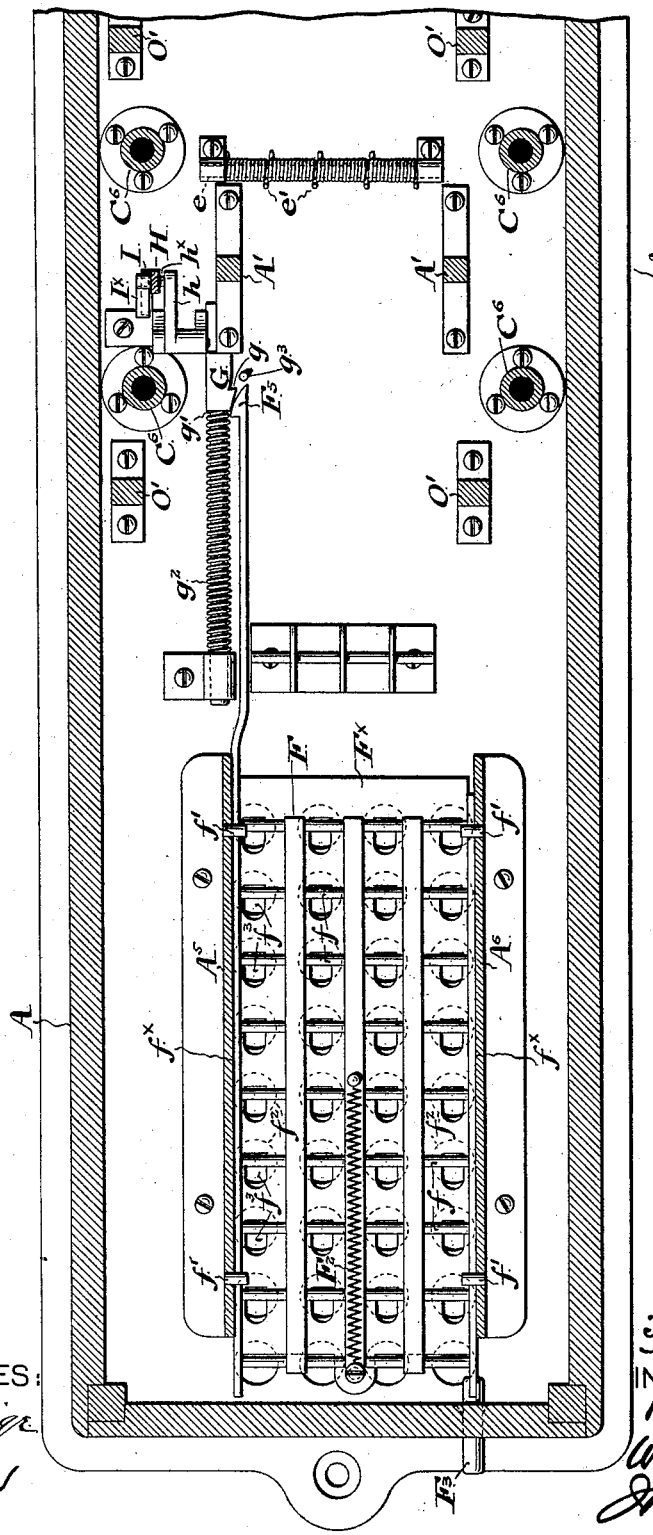
Figure 5 is a fragmentary sectional plan of the apparatus illustrating the grid and the device by which the same is shifted.

F, Figures 2 and 5, is a flat skeleton framework, or grid, as I hereinafter term it, provided with a series of transverse bars $f$ corresponding in number with the number of keys in a row,—nine in the machine shown,— resting upon the floor of the casing beneath the key board, with its bars $f$ in line with the transverse rows of keys, and free for longitudinal movement between ways $f^\times$ erected from the floor of the casing, and provided with studs $f'$ which overhang the side members of said grid and hold it down upon said floor.

Each of the keys is provided with a depending spring tongue $d^0$ equipped at its lower extremity with a shoulder or barb, which shoulders or barbs, upon the depression of the keys, seat themselves beneath the transverse bars $f$ and temporarily retain the keys in depressed condition, and consequently temporarily secure the type blocks, thrown into operative position by the depression of the keys, in such operative position.

As the grid rests upon the floor of the casing I form pockets $f^2$ in said floor, Figures 2 and 5, to receive the extremities of the spring tongues $d^0$; and place upon said floor a plate F$^\times$ having apertures $f^3$ smaller than but in registry with said pockets, the overhanging edges of which apertures, when the spring tongues $d^0$ are engaged beneath the bars $f$, are in contact with the faces of said tongues, and therefore, when the grid is moved toward the inner end of the machine to release the spring tongues, said plate operates to hold the tongues from moving with the grid and thus trips them, so to speak, out of engagement therewith.

As soon as the spring tongues $d^0$ are released, the keys are forced by their springs $d^2$ up into normal or protruded position, and simultaneously therewith the thrust bars are retracted, throwing out of operative position the type blocks with which they are connected, and enabling the springs $e'$ to force the cipher type blocks back again into operative position, which is, as explained, their normal position.

F$^2$, Figure 5, is a spiral pull spring secured to the grid and to any point of permanent attachment within the casing, by which the grid is normally maintained close to the front of the machine, in position to be engaged by the spring tongues as explained.

F$^3$ is a projection or handle extending from the outer end of the grid through to the exterior of the casing, which projection may be manually forced inward to occasion inward movement of the grid and the release of the keys when it is desired to scatter the type blocks before an impression is made from them, as, for instance, where a mistake has been made in manipulating the keys and a type block not intended to be used at the time has been thrown into operative position.

In the ordinary and contemplated operation of the machine however, the grid is of course not to be moved to release the keys until after an impression has been taken from the assembled type, and is at that time to be automatically released by the following described mechanism.

F$^4$, Figure 5, is a spring tongue extending from the grid, to which it is attached, to the region beneath the movable chase C, where it is equipped with an outwardly facing barb or shoulder, having a deflecting head F$^5$.

G, Figure 5, is a releasing bar, mounted in a slide bearing in parallelism with said spring tongue F$^4$, and provided with a barb or hook $g$, and with a shoulder $g'$. $g^2$ is a spiral push spring surrounding said bar G, bearing as to one extremity against the shoulder $g'$ and as to its other against the socket in which said bar slides, the effect of which spring is to constantly force said bar G longitudinally away from the bank of keys.

$g^3$ is a deflecting pin erected from the floor of the casing and adapted to be encountered by the deflecting head F$^5$ of the tongue F$^4$.

H, Figures 1, 5, 13, and 20, is a depending bar secured to the movable chase C and vertically movable with said plate. $h$ is a suitably supported bell crank lever one end of which is pivotally secured to the bar G, and the other end of which is provided with a wrist pin $h^\times$ engaged in a slot $h'$ in the bar H.

I is a keeper pawl, pivotally secured to a suitable lug on the floor of the casing, and extending upward in proximity to the exterior face of the bar H, and provided with a shoulder or barb $i$ and with a deflecting nose $i^\times$. I$^\times$ is a band or C-spring mounted on the bar H and constantly pressing the pawl I toward the wrist pin $h^\times$ and into contact with a deflecting pin $h^2$ projecting from the face of the bar H.

When then the movable chase C, which is, as hereinafter explained, depressed in the operation of taking an impression from the type blocks,—descends, it, through the bar H, (in the upper end of the slot $h'$ of which the wrist pin $h^\times$ naturally rests under the stress of the spring $g^2$ on the thrust bar G) occasions the throw of the bell crank lever $h$, and the longitudinal movement of the thrust bar G, in the direction of the key bank and against the stress of the spring $g^2$, and until its barb passes and faces the barb of the spring tongue F$^4$ of the grid, the set of which spring tongue F$^4$ is such that its barb immediately latches or engages with the barb $g$ of said bar G, (Figure 5.)

As the bar H thus descends, the barb $i$ of the pawl I, under the influence of the spring I$^\times$, engages the wrist pin $h^\times$ of the bell crank, and, consequently, when, the movable chase C and depending bar H, upon the completion of the impression begin to ascend, said pawl holds the bell crank in its thrown position, and consequently the bar G in the forward position it has been caused to assume against the stress of its spring, and as the bar H travels upward, its slot $h'$ travels past the wrist pin $h^\times$, without effect, for a time, upon the bell crank.

As the bar H ascends, however, its projecting or deflecting pin $h^2$ is carried against the deflecting nose $i^\times$ of the pawl, as shown in Figure 1, and said pin forces the pawl rearwardly against the stress of its spring I$^\times$, causing its shoulder or barb $i$ to release the wrist pin $h^\times$ of the bell crank lever.

As soon as said pin $h^\times$ is thus released, the spring $g^2$ of the bar G forces said bar forward (incidentally returning the bell crank to its original position with its wrist pin $h^\times$ at the upper end of the slot $h'$ in the bar H) and said bar G of course carries forward with it the spring tongue F$^4$ in latched engagement, as stated, with it, and also, of course, the grid to which said tongue F$^4$ is attached, thus automatically releasing the barbs of the keys which are engaged with the bars $f$ of said grid.

The spring tongue F$^4$ and the grid F are thus carried in the direction of movement of the bar G, until the deflecting head F$^5$ of the spring tongue F$^4$ encounters the deflecting pin $g^3$, by which said tongue F$^4$ is unlatched from the bar G, and thereupon, the grid is, under the pull of the spring $F^2$, returned to its normal position.

As is obvious, as soon as the movement of the grid releases the spring tongues $d^0$ of the keys, the latter fly up to their normal position as described, and the machine type blocks distribute themselves automatically to their original positions.

As the impression of the type blocks upon the record strip is made when the movable chase C is at the lowest point of its descent, it is obvious that if a positive engagement existed between the depending bar H and the wrist pin $h^\times$, the distribution of the machine type blocks would begin almost at the moment the plate C and bar H begin their ascent, and perhaps before the type blocks left the paper, with the result that a blurred impression on the record strip might be produced.

By the arrangement described however, by the provision of the wrist pin and slot connection between the bar H and the bell crank lever, and the provision of the pawl, a dwell of the grid-controlling and releasing parts occurs until the type blocks and paper have become so far separated that the possibility of smearing the latter is precluded.

Figure 11:
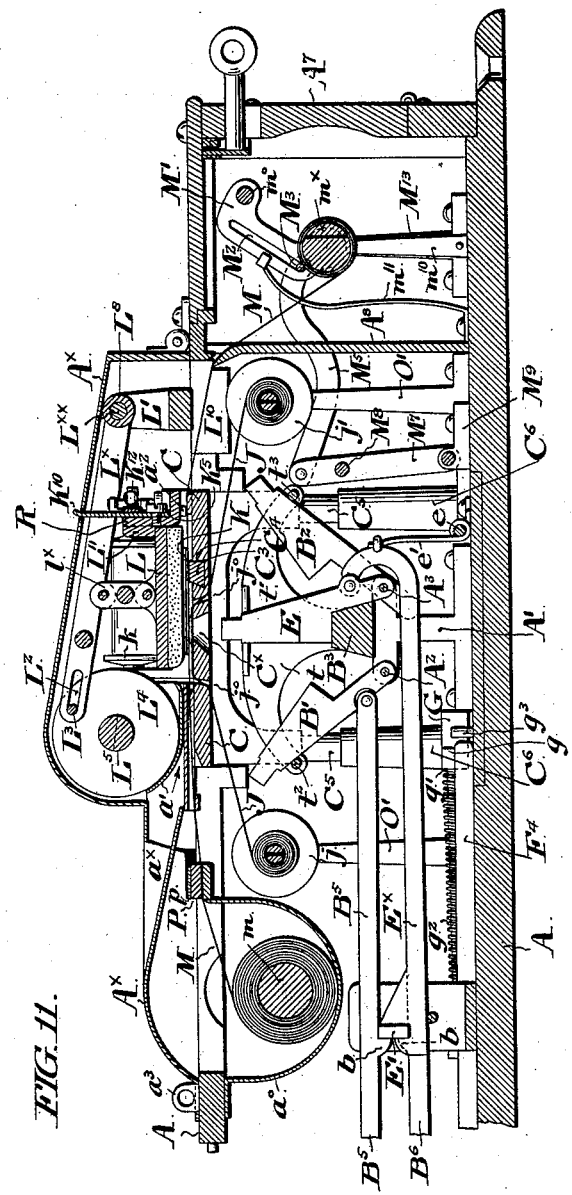
Figure 11 is a fragmentary side sectional view of a portion of the apparatus the figure being especially designed to illustrate the arrangement of the type blocks and thrust bars, the record strip, the ribbons, the platen and the device for actuating the platen and movable chase.
Figure 15:
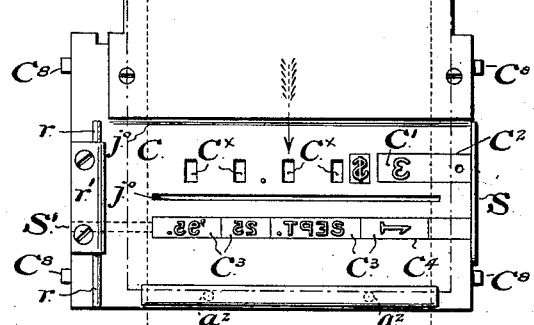
Figure 15 is a top plan view of the movable chase.
Figure 20:
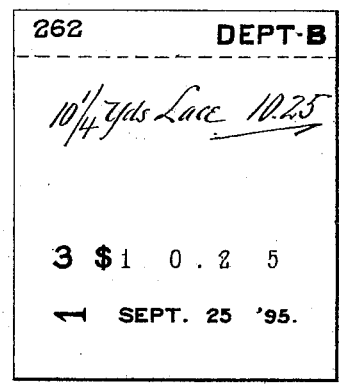
Figure 20 is a view in side elevation of the movable chase and depending bar.

The movable chase C, is provided as explained, with a series of openings $C^\times$ through which type blocks, assembled in operative position by the manipulation of the keys, present upon the depression of said chase,—but is also provided, as shown in Figures 11, 15, and 20, with a series of ordinary removable types $C'$ placed in a groove $C^2$ in line with the openings $C^\times$ and also with a line of removable type $C^3$ mounted in a groove $C^4$ in said plate in parallelism with said openings $C^\times$, and which removable type, in every impression taken, make their imprint upon the record sheet in juxtaposition to the imprint made upon said sheet by the machine type blocks.

Figures 19, 21:
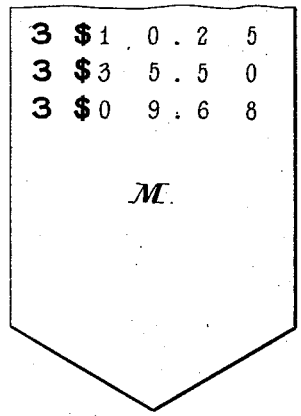
Figure 19 is a view of a portion of the record strip.
Figure 21 is a view of a sale slip bearing the imprint which my apparatus is designed to make.

Thus in connection with the first line of numerals "1" "0" "2" "5" printed upon the record sheet in Figure 19, by the machine type blocks, as well as in connection with each of the succeeding lines of numerals, I show, as printed a dollar mark, and the number "3," which latter number indicates the particular cashier in charge of the machine,—the imprint "$" being taken from a fixed type and the imprint "3" being taken from an ordinary removable rubber faced or other type mounted in the groove $C^2$ in the movable chase, in alinement with the openings $C^\times$ therein.

In the second groove or socket, $C^4$, in the movable chase, removable types adapted to print the date or any selected legend, may be set up anew each morning, together with the symbol of the machine, herewith shown as the numeral 1 horizontally disposed.

Said type setting is conveniently effected by means of a type setting rod (see Fig. 18.) without removing the ink ribbon J, etc.

In the operation of the machine, as hereinafter described, the line of type comprising the machine block type the cashier's number and the dollar mark, is alone printed upon the record strip, as shown in Figure 19, while both said line, and the second line of type indicating the date, and the symbol of the machine, are, as shown in Fig. 21, printed on the face of the memorandum or sales slip sent in by the salesperson to the cashier in connection with each sale.

J, Figures 1, 6, 9, 11, and 13, is an inking ribbon mounted upon spools $j\ j'$, situated respectively at the front and rear of the movable chase C, said ribbon being, in the operation of the machine, alternately wound upon one and unwound from the other, of said spools.

This ribbon passes in its course up through one of a pair of openings $j^0$, Figures 11 and 15, across the faces of the movable and fixed type, and down through the other of said openings $j^0$. As will be seen this ribbon does not pass across the face of the row of movable type, $C^3$.

K, Figures 1, 3, 9, 11, and 16, is an inking ribbon, mounted upon the spools $k\ k'$, situated respectively at the respective ends of the platen, whereof hereinafter, said ribbon being, in the operation of the machine, alternately wound upon one and unwound from the other, of said spools.

This ribbon K passes in its course across the faces of both rows of type.

M, Figure 11, is the record strip, the same being a strip or sheet of paper or other material, mounted upon the rolls, or spools $m\ m^\times$, and extending across the face of the movable chase C and above the ribbon J but below the ribbon K. In the operation of the machine the record strip M is, by the rotation of the roll or spool $m^\times$, wound upon said roll, being thereby drawn step by step across the face of the movable platen.

The movable chase C is provided with four depending legs, $C^5$, which are entered in the bores of four corresponding upwardly extending sockets $C^6$ erected upon the base plate of the machine, within which bores beneath said legs are disposed spiral push springs $C^7$ which operate to maintain the movable chase normally in its uppermost position in contact as to its edges with the top plate of the machine.

L is a platen of suitable construction, best shown in Figure 11, supported at points intermediate of its respective extremities, by links $l^\times$, from the twin members of a lever $L^\times$, which is as to one extremity connected by a pivotal connection to a cross piece $L'$ or other fixed portion of the framework of the machine, and as to its other, double extremity, provided with slots $L^2$ in which is entered a wrist pin $L^3$ supported between wrist plates $L^4$ mounted on a rock shaft $L^5$ provided with an operating handle $L^6$, which last named device is best shown in Figures 3 and 22.

$L^{10}$ are plates depending from the cross piece which serve to guide the record strip through the machine.

Figure 25:
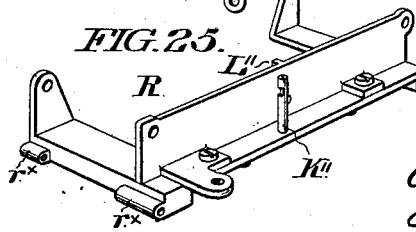
Figure 25 is a view in perspective of the frame R.

$L^{11}$ is a fin inwardly projecting from the frame R, Figure 25, and which, overhanging the rear edge of the platen, prevents the front edge of the latter from tilting downward.

The platen, depending by its links $l^\times$, is supported in a horizontal position immediately over the movable chase C and the movable type and type openings arranged therein,—but separated therefrom by a slight interspace through which pass as shown in Figure 11, the record strip, and the inking ribbons J and K hereinbefore mentioned.

$A^\times$, Figure 11, is a hinged cover inclosing those portions of the mechanism which project above the body of the casing, the same being provided with an opening or slot $a^\times$, hereinafter described, at its front end.

$a^3$, is a lug mounted on or erected from the top of the main casing and which projects through an aperture in the front end of said cover $A^\times$. By the application of a padlock to said lug the hinged cover may be secured in closed position.

$a'$, Figure 11, is a guide plate mounted beneath said cover and extending horizontally from said slot to the point where the ribbon J rises through the opening $j^0$.

When the cashier in charge of the machine receives a sales slip, he proceeds to examine the same and to print the amount thereof upon the record strip M, to produce a record of the character shown in Figure 19, and the amount thereof, and also the date, upon the sales slip itself, to produce an imprint of the character shown in Figure 21, by manipulating the keys, in the manner described, to assemble the appropriate type-blocks to make the required imprint.

The type being supposed assembled and automatically locked in position, the sales slip is passed in through the slot $a^\times$ and along the guide plate $a'$ until said slip enters between the lower face of the platen L on the one hand, and the upper face of the inking ribbon K on the other. The ingress of said slip is limited by convenient stop pins or studs $a^3$, $a^2$.

The operating handle $L^6$ being now depressed, the rock shaft $L^5$ is rotated with the result that the wrist pin $L^3$ forces down the lever $L^\times$ with the result that the platen, sales slip, record strip, and ribbons, are carried down against the upper face of the movable chase, and movable type set therein, and, in the continued movement of the said lever, the movable chase is depressed against the stress of its springs $C^7$, to a position in which the acting faces of the machine type blocks $B'$ $B^2$ project through openings $C^\times$ flush with the movable type and against the ink ribbon J.

Thereupon the handle $L^6$ is released, and the chase, under the influence of its springs, is caused to ascend to its normal position, being limited in its upward movement at the proper point by contact of the stops $C^8$, (Fig. 20) with the frame, and the platen, L, with its connected parts also ascends, being raised by the ascent of the chase and further raised by the action of a spiral spring $L^7$ mounted on the rock shaft $L^5$ secured to said shaft and to a fixed portion of the casing respectively.

In the depression of the platen, record strip, sales strip, and inking ribbons, the inking ribbon J, the record strip, the inking ribbon K, and the sales slip were, in the order named, carried against the movable type and fixed type in alinement therewith, (except that the ribbon J did not make contact with the row of fixed type $C^3$,) with the result that the line of machine type blocks and movable type printed through the inking ribbon J against or upon the record strip, and, further, through the inking ribbon K against or upon the sales slip thus contemporaneously making two imprints,—while, the row of movable or dating type $C^3$ made contact with the record strip, but by reason of the absence of an interposed inking ribbon did not print thereon,—but pressed, through the record strip, the ribbon K against the sales strip and made through said ribbon due imprint upon the sales slip, of the date or other matter adapted to be printed by said movable type.

The sales slip is thereupon manually withdrawn through the slot $a^\times$ and returned to the sales person.

The movement of the parts in this operation of carrying the platen to and from the type as hereinbefore described, occasions (apart from the movement of the grid already explained) the operation of three other groups of instrumentalities required to perform the three functions of, first, occasioning the travel of the ribbon J,—second, occasioning the travel of the ribbon K,—and, third, occasioning the travel of the record strip,—and these three groups of instrumentalities I now proceed to describe in the order named.

The spools $j\,j'$ are, as shown in Figure 9, each as to one end provided with a toothed wheel, designated $j^2\,j^3$ respectively.

The projecting spindles $j^\times$ of said spools are both squared upon their ends and thus adapted for engagement by the key shown in Figure 23, whereby they may be rotatively adjusted.

Figure 8:
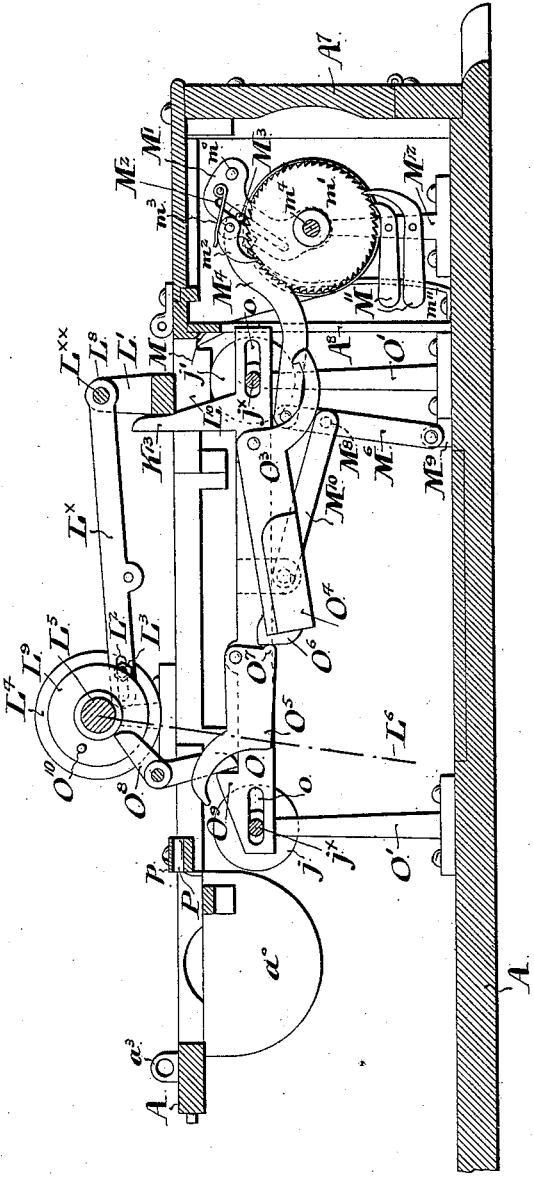
Figure 8 is a fragmentary vertical side sectional elevation of a portion of the machine illustrating the mechanism by which the record strip winding is effected.

O, Figures 8 and 9, is a slide bar having longitudinal slots $o$ one in each of its respective ends, through which slots pass the projecting spindles $j^\times$ of the spools $j\,j'$ extending outward from a pair of supports $O'$, the arrangement being such that the slide bar is supported in horizontal position and free for limited longitudinal reciprocation on said projecting spindles $j^\times$.

A spring $O^2$, Figure 6, tends to constantly force said slide bar toward the rear or inner end of the machine.

$O^3$, Figure 8, is a pawl pivotally attached to one end of the slide bar,—extending beneath the toothed wheel $j^3$, and provided with a spur adapted to engage with the teeth of said wheel, and also provided with a shank, $O^4$, which as it exists on the side of the pivot opposite that on which the spur exists, tends by its weight to normally maintain said pawl in engagement with the teeth of the wheel.

$O^5$ is a pawl pivotally attached at its rear end to the opposite end of the slide bar O, and having a spur which overhangs the wheel $j^2$ and by its weight constantly tends to engage with the teeth of said wheel.

The front end of the shank $O^4$ is provided with a stud $O^6$ which when said shank is in the position shown in Figure 8 bears against a rear stud $O^7$ on the pawl $O^5$ and tilts said pawl on its pivot and holds it out of engagement with its wheel $j^2$.

If, now, when the parts are in the position shown in said Figure 8,—reciprocation be imparted to said slide bar O, each time said bar is moved to the front or left of Figure 9, its pawl $O^3$ will occasion a slight rotation of the spool $j'$ to the right and a consequent winding of the ribbon J upon said reel,—while each time said bar is moved to the right its pawl will take a fresh hold upon the toothed wheel $j^3$ to occasion further rotation of said spool to the right when next said bar O is moved to the left.

A crank $J^\times$ is mounted in the side wall of the casing, see Figures 6, 22, and 24, having an exterior operating handle $J^2$ and provided within the casing with a pin $J^3$. When the ribbon has been all wound upon the reel $j'$ as described the crank handle is rotated to the left, Figure 22, to carry its pin $J^3$ up against the shank $O^4$ of the pawl $O^3$ with the result that said pawl will be tilted and maintained out of engagement with the toothed wheel $j^3$, and the further result that such tilting will occasion the release of the pawl $O^5$ which will thereupon drop into engagement with the toothed wheel $j^2$.

In the further reciprocation of the slide bar O, the wheel $j^2$ will be rotated to the left with the result that the ribbon will be caused to travel to the left until it is all wound on the wheel $j$.

Thereupon the crank $J^\times$ is rotated to its original position, and the parts restored to the position shown in Figure 8.

In order to impart movement of reciprocation to the slide bar O I prefer to resort to the following arrangement.

$O^8$, Figures 6, 8, and 9, is a bell crank lever, pivotally mounted upon the framework of the machine, and as to its lower end adapted to encounter a stud $O^9$ projecting from the slide bar, and as to its upper end adapted to be encountered by a pin $O^{10}$ projecting from the wheel $L^9$, which wheel, is secured upon the rock shaft $L^5$ and is rocked or partially rotated in the depression of the lever handle $L^\times$.

As will be understood from an examination of Figure 8, the pin $O^{10}$ is so located upon the wheel $L^9$ that in the descent of the lever $L^\times$ and the consequent depression of the movable chase, the said pin is carried away from the bell crank $O^8$, when, then, the projection $O^{10}$ is carried away from the bell crank,—the slide bar, under the influence of its spring, is instantly carried back toward the rear of the machine, there remaining stationary, during the making of the impression,—but in the ascent of the chase and lever $L^\times$ and the return movement of the wheel $L^9$, after the impression or imprint has been made, said pin is carried against said bell crank $O^8$ and through it occasions the movement of the said slide bar, against the stress of its spring $O^2$ thus said bar O, is caused to slide or move endwise each time the apparatus is operated to make an imprint.

Figures 16, 18:
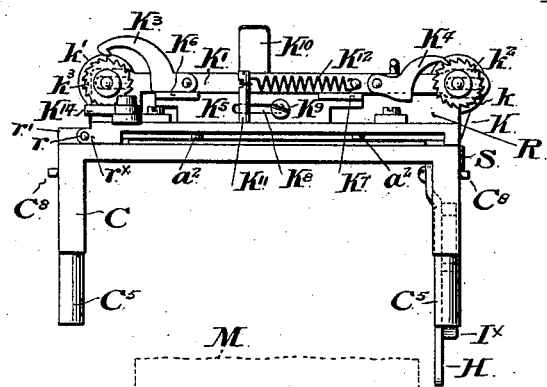
Figure 16 is a view in rear elevation of the movable chase and associated parts.
Figure 18 is a view of the type setting rod.

The ribbon K, Figures 3, and 16, is, as described, mounted upon spools $k\ k'$ situated respectively at opposite ends of the platen. The shafts of these spools are mounted in suitable bearings in a hinged frame R fixed upon the movable chase C, and extending above the platen L, and are each provided at one extremity with a ratchet wheel, which wheels are designated respectively $k^2\ k^3$.

Figure 17:
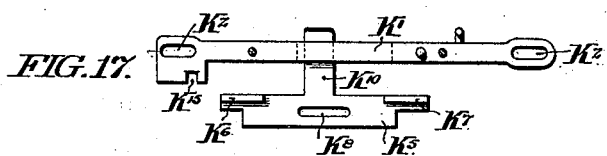
Figure 17 is a view in rear elevation of a portion of the mechanism for shifting the ribbon K.

$K'$, Figure 17, is a pawl carrying bar provided with slots $K^2$ in its respective extremities, through which slots the shafts of the respective spools $k\ k'$ extend, with the result that by reason of said slots said bar is adapted for limited endwise movement or reciprocation.

$K^3\ K^4$, Figure 16, are pawls pivotally mounted upon the respective extremities of the pawl carrying bar $K'$, and adapted to engage, respectively, with the ratchet wheels $k^3\ k^2$. Each of these pawls is formed with a horizontally extending shank or base so arranged that when the pawl is in engagement with its ratchet wheel, said shank or base drops below the pawl carrying bar.

$K^5$ is a longitudinally movable pawl-controlling plate disposed beneath the pawl carrying bar, and provided with horizontal extensions $K^6$ and $K^7$ adapted to encounter the depending shanks of the respective pawls.

These extensions are so arranged upon the plate $K^5$ and with such relation to the pawls $K^3$ and $K^4$ and their pivots, that when said plate is moved to the left as shown in Figures 3, and 16, the extension $K^6$ encounters the pawl $K^3$ and raises it out of engagement with its ratchet wheel, $k^3$, while, in the same movement, the extension $K^7$ is withdrawn from beneath the pawl $K^4$, which is thus enabled to drop into acting engagement with its ratchet wheel $k^2$.

As will be understood, therefore, one or the other of the said pawls will always be in engagement with its ratchet wheel, and, reciprocation being imparted to the bar $K'$, positive rotation will be imparted to that one of the spools $k\ k'$ the ratchet wheel of which is engaged by a pawl, with the result that the travel of the inking ribbon K will be thereby occasioned.

When the inking ribbon K has, in the manner described, been completely unwound from one of its spools and wound upon the other, and it is accordingly necessary to reverse its movement, it will be only necessary to reverse or shift the position of the plate $K^5$ to the right or left as the case may be.

The plate $K^5$ is provided with a longitudinal slot $K^8$, the length of which corresponds to the desired and necessary movement of said plate, through which slot extends a pin or stud $K^9$ projecting from a portion of the fixed hinged frame R.

In order to arrange for the convenient shifting of the pawl controlling plate $K^5$, I provide it with an upwardly extending handle $K^{10}$, which projects through a slot in the cover plate $A^\times$ of the machine, which handle may be readily grasped by the cashier or operator and moved to the right or left, carrying the plate $K^5$ with it.

$K^{11}$ is a fixed stud or projection, and $K^{12}$ a spiral pull spring the respective extremities of which are attached to said stud and the pawl carrying plate respectively, with the result that said spring constantly tends to draw said plate to the left, Figure 16.

Reciprocation may be imparted to the pawl carrying plate, of course, from any moving part of the apparatus. I prefer, however, to resort to the following arrangement:

The slide bar O, which is moved longitudinally as described each time the operating handle or lever of the machine is thrown, is provided with a rigid upwardly extending toe $K^{13}$, Figures 3, 8, and 9, adapted to encounter one arm of a bell crank lever $K^{14}$ the other arm of which is entered loosely in a slot $K^{15}$, Figure 17, in the base of the pawl carrying bar.

In the rearward movement of the bar O, the toe $K^{13}$ is carried away from the bell crank lever, and thereupon the spring $K^{12}$ comes into play and shifts the pawl carrying plate, pawls, and bell crank lever, to the left of Figure 16.

In the forward return movement of the bar O, therefore, the toe $K^{13}$ is carried against and trips the bell crank lever $K^{14}$ which thereupon moves the pawl carrying bar to the right against the stress of its spring $K^{12}$, into its normal position with the result that one or the other of the ratchet wheels $K^2$ $k^3$, according to the position of the pawl controlling plate, is advanced a notch or tooth.

The record sheet or strip M is as stated unwound from the roll $m$ and, in the operation of the machine, wound, as a record or impression is made upon it, upon the roll $m^\times$, which is automatically rotated to draw the strip M slightly forward each time the operating handle or lever is thrown, and I now proceed to describe the mechanism by which the positive rotation of said roll $m^\times$ is effected.

Figure 12:
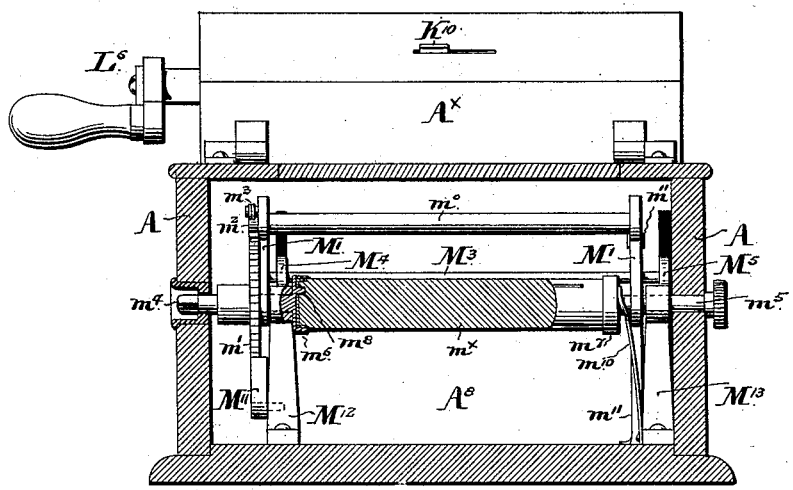
Figure 12 is a transverse section of the machine section being supposed taken on the dotted line 12—12 of Figure 1 and sight being taken in the direction of the arrows applied to said line.

Spindles $m^4$ and $m^5$ are respectively provided with cup shaped inner ends $m^6$ and $m^7$ whereby the respective ends of the roll $m^\times$ are engaged. Positive rotary motion is imparted to said roll from the spindles $m^4$ by means of its clutch pin $m^8$ (Fig. 12.) Said spindles are mounted for rotation in respective bearings $M^{12}$ and $M^{13}$. To effect the insertion or release of the roll $m^\times$, the spindle $m^5$, may be slightly withdrawn by means of its milled head; said spindle is maintained in its normal position of engagement by the flat spring $m^{10}$.

$M'$, Figures 1, 6, 8, 11, and 12, are a pair of ears radially projecting respectively from the respective end spindles of the roll $m^\times$, upon which they are loosely mounted, and conveniently connected, for firmness of structure, at their outer extremities, by a tie bar $m^0$, and each embodying a slot, $M^2$, which slots are counterpart, and tangential. A flat spring $M^{11}$ serves to keep said connected ears in proper position for actuation.

$M^3$ is a slot bar, extending through both slots, to the respective extremities of which are connected the rear ends of the respective members of a pair of links $M^4$ $M^5$, the front ends of which are respectively connected to the upper extremities of a pair of oscillatory bars $M^6$ $M^7$, connected by a transversely extending tie bar $M^8$, and the lower extremities of which are pivotally secured to the lugs $M^9$ upon the floor of the casing.

$M^{10}$, Figure 8, is a link pivotally connected as to one extremity to the slide bar O and as to the other to the oscillatory bar $M^6$.

Upon the spindle $m^4$ of the spool $m^\times$ is mounted a ratchet wheel $m'$, see Figures 6 and 12, and upon one of the ears $M'$ is mounted a pawl $m^2$ constantly pressed by a spring $m^3$ into engagement with the teeth of said wheel, with the result that whenever said ears are drawn forward the engagement of said ear with the roll through the pawl $m^2$ ratchet wheel $m'$ and spindle $m^4$ will occasion the rotation of the spool and the consequent winding up of a length of the record strip proportioned to the length of the stroke or movement of said ears.

The said ears being connected, through the slot bar $M^3$, links $M^4$ $M^5$, oscillatory bars $M^6$ $M^7$, tie bar $M^8$ and link $M^{10}$, to the slide bar O, it is obvious, that whenever said bar O is allowed to move rearwardly in the making of an impression, the ears $M'$ will be thrust rearward, pawl $M^2$ will be engaged and the reverse movement of the bar O will occasion a consequent rotation of the roll $m^\times$.

As will be understood, a slight gain in the length of throw of the ears is attained by connecting the slide bar O to the oscillatory bar $M^\times$ at a point below that at which the links $M^4$ $M^5$ are connected to it,—as opposed to a more simple construction in which one of the links $M^4$ $M^5$ might be extended forwardly and attached directly to said slide bar O.

The slot bar $M^3$ is entered loosely in the slots of the ears $M'$, and is therefore free to move lengthwise of said slots. As traction toward the front of the machine is, however, entered upon said slot bar through the links M⁴ M⁵, said slot bar rests in contact with the roll of paper on the reel $m^×$, and the acting position of said bar in said slots is governed by the diameter of said roll.

As will be understood, it is desirable that in each forward movement of the slide bar O the record strip should be drawn rearward a given and uniform distance, to the end that impressions upon the strip may be made at uniform distances apart.

As the size of the roll of paper on the reel $m^×$ constantly increases on the operation of the machine, the length of the record strip drawn through the machine at each movement of the slide bar O, would, if at each movement of said bar O the roll $m^×$ were given a rotation of say one twentieth of its circumference, correspondingly increase, with the result that impressions made upon the record strip would be made at constantly increasing distances apart,—and to overcome this, and to make the rotation of the roll $m^×$ at each movement of the bar O, less, as the size of the roll of paper upon it increases, I resort to the arrangement described.

In this arrangement, when the spool is empty, and the slot bar M³ at the bottom of its slots (see Figure 11) the forward movement of the links will occasion a very considerable rotation of the spool $m^×$. As, however, (see Fig. 8) the roll of paper on the spool enlarges and raises the slot bar M³, and consequently raises the point at which the links act upon the ears M⁷, the movement of the links M⁴ M⁵, under the actuation of the slide bar O, will occasion a correspondingly less rotation of the spool, with the result, that notwithstanding the size of the spool increases, the same length of record strip will be drawn through the machine at each operation as was drawn when the slot bar was at the bottom of its slots.

M¹¹ are a pair of pawls pivotally mounted upon the standard M¹² which supports the spindle $m^4$,—and provided with counterweight extensions which maintain their acting faces or points constantly against the periphery of the ratchet wheel $m'$ on the spindle $m^4$.

These pawls Figures 1 and 8 are so set that when one is engaged in the bottom of the notch between two adjacent teeth the other is in contact with another tooth midway of its length, with the result that said wheel, after very slight forward rotation is immediately secured against recoil, by the engagement of one or the other of said pawls behind one of its teeth.

The unwinding roll $m$ is simply an idle roll, mounted loosely in a suitable pocket or chamber $a^0$ in the top plate of the casing, as shown in Figures 8 and 11.

If desired of course the roll $m$, may be dispensed with, and a roll of paper without core of any kind, be deposited in and fed through the machine from, said chamber or pocket $a^0$.

To avoid spontaneous or too rapid unwinding and loosening of said roll, I prefer to use a retarding device such, for example, as that shown in Figure 4, which is simply a bar of rigid metal P provided with a flat curved spring $p$, having notches in its ends, the central portion of which spring is secured to the central portion of the bar so that its ends diverge from the ends of the bar. When the structure is mounted across the top of the chamber $a^0$, as shown in Figure 3, the said spring will press the bar with yielding force against the paper as shown in Figure 11.

As shown in Figure 3, the pivoted end of the lever L× is provided with a hollow sleeve L⁸, and the pivotal connection between said lever and the lugs L', is secured by a pin L×× entered through said lugs and sleeve.

As will be understood, upon the removal of the pin L××, the lever L× with its connected parts, may be tilted upward upon its connection with the wheels L⁴ as an axis, to permit access to the parts beneath.

The end of the spindle $m^4$ of the spool $m^×$, is squared, in correspondence with the spindles $j^×$ of the spools $j$ and $j'$ and access is had to said spindle through the side wall of the casing as shown in Figure 22.

By the application of the key Q shown in Figure 23 to said spindle $m^4$ the roll $m^×$ may be manually rotated, without opening the casing, to take up any slack or looseness in the ribbon J or record strip M.

The rear door A⁷ conveniently provided with lock and key as indicated in Figure 11, permits the removal of the roll $m^×$ and accumulated strip M. Access to the interior of the apparatus through the rear doorway is however provided by the baffle plate A⁸.

R is a skeleton frame, shown in Figure 25, in or on which the spools $k$ $k'$, bar K', and associated parts are mounted. This structure is hinged upon, and forms in effect a part of, the movable chase C, a pivot pin $r$ being entered in the lugs $r^×$ of the structure R, and a lug $r'$ secured to the end portion of the chase C, see Figure 15. The structure R, may be tilted upon this pivotal connection to enable access to the parts beneath.

Figure 14:
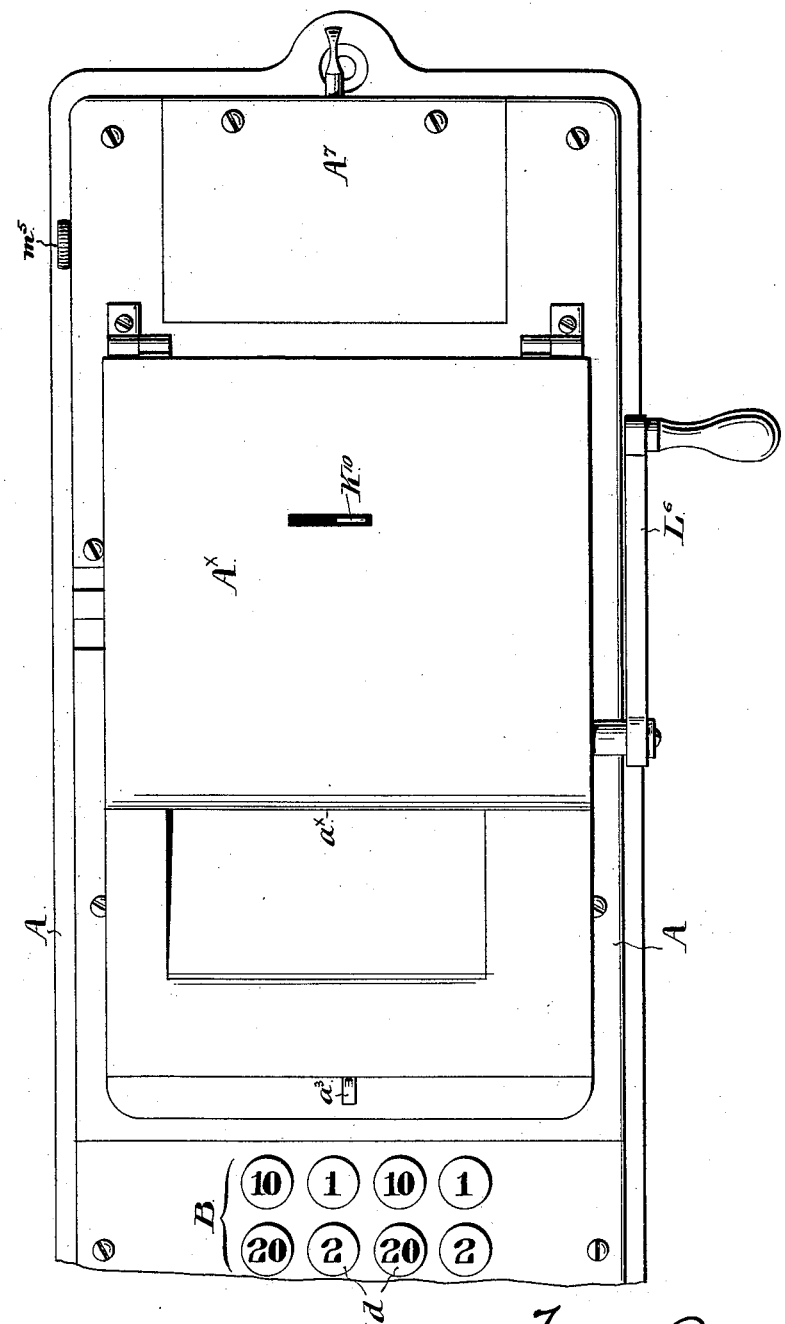
Figure 14 is a fragmentary top plan view of the machine.

Apertures are formed in the side wall of the casing, as shown in Figures 1 and 14, through which the movable type may be inserted into position in the grooves in the movable chase.

Figure 13:
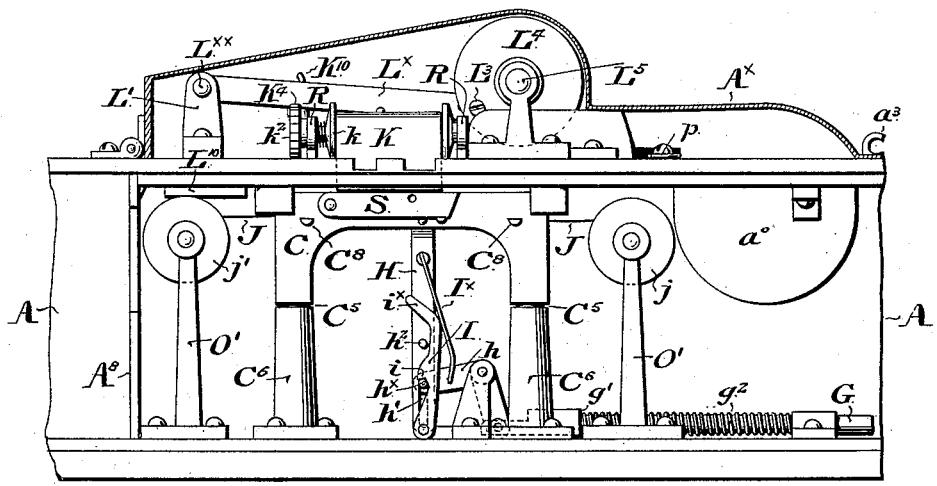
Figure 13 is a view in side elevation of a fragmentary portion of the apparatus and designed especially to illustrate the connection between the bar depending from the chase and the thrust bar the drawing forward of which automatically releases the grid.

A small hinged cover S, Figures 13 and 20 ordinarily covers these openings.

A small aperture S' Figures 9 and 15 leads through the opposite wall of the casing into the groove C⁴ in which the line C³ of type is set up, through which the drift pin S× (Figure 18) may be introduced to expel said movable type.

Having thus described my invention I claim:—

1. In a recording apparatus, in combination, a number of type blocks arranged in double parallel series and adapted to be tilted to positions in which the acting faces of individual blocks in the two series are in a common line, key-controlling mechanism for manipulating said blocks, means for retaining selected blocks, when tilted, in operative position, means for supporting a piece of paper to be imprinted, means for causing the approach of said paper and the selected tilted blocks, and means for supplying ink to the faces of the selected blocks, substantially as set forth.

2. In a recording apparatus, in combination, a number of type blocks arranged in double parallel series, blocks in each series being adapted to be tilted toward the blocks in the other series to positions in which the acting faces of blocks in the two series are in a common line, key-controlled mechanism for manipulating said blocks, means for retaining said blocks temporarily in tilted or operative position, a platen, a record sheet or strip, an inking ribbon, means for causing the approach of the assembled type blocks and platen, means for causing the type blocks when released to return to their distributed or non-operative positions, means for causing the travel of the record sheet or strip, and means for occasioning the travel of the inking ribbon,—substantially as set forth.

3. In a recording apparatus, in combination, machine type blocks and key controlled mechanism for carrying the same, means for retaining said blocks temporarily in operative position, removable type blocks, an inking ribbon extending across said removable type blocks, a second inking ribbon extending across the type blocks first named, means for occasioning the approach of the platen and type, a record strip extending across the face of the platen, and automatic means for occasioning the travel of two inking ribbons and of the record strip or sheet, substantially as set forth.

4. In a recording apparatus, in combination, machine type blocks and key controlled mechanism for carrying the same, means for retaining said blocks temporarily in operative position, removable type blocks, means for supporting the same, an inking ribbon extending across said removable type blocks, a second inking ribbon extending across the type blocks first named, means for occasioning the approach of the platen and type, a record strip extending across the face of the platen, and automatic means operated by the movement of the parts which are moved in the approach of the platen and the blocks, for occasioning the travel of two inking ribbons and of the record strip or sheet, substantially as set forth.

5. In a sales recording apparatus, in combination, a series of movably supported machine type blocks, mechanism actuated through keys for throwing individual selected blocks into operative position in an assembled line, automatic mechanism for temporarily retaining each of said blocks in operative position, a movable chase embodying apertures in line with the assembled type blocks, and provided with means for supporting type distinct from said machine type blocks, a movable platen across the face of which extend a piece of paper and an inking ribbon, means for causing the chase to advance to a position in which the acting faces of the machine type blocks extend through its openings, and the contemporaneous movement of the platen to press the inking ribbon and paper against the said type to occasion the making of an impression, and means for occasioning the advance of the ribbon and the advance of the paper after the making of each impression, substantially as set forth.

6. In a sales recording apparatus in combination, a series of movably supported machine type blocks, mechanism actuated through keys for throwing individual selected blocks into operative position in an assembled line, automatic mechanism for temporarily retaining each of said blocks in operative position, a movable chase embodying apertures in line with the assembled type blocks and carrying a line of removable type distinct from the line of said machine type blocks, a movable platen, a record strip extending and adapted to travel across the face of the platen, an inking ribbon extending and adapted to travel across the openings in the movable chase but not across the distinct line of removable type, an inking ribbon extending and adapted to travel across the platen and over both the openings in the movable chase and the line of movable types, means for guiding a memorandum or sales slip to a position between the second inking ribbon and the face of the platen, and means for causing the chase to advance to a position in which the acting faces of the type blocks extend through its openings, and the contemporaneous movement of the platen to carry the papers and inking ribbon against the faces of the machine type blocks and removable types, substantially as set forth.

7. In a sales recording apparatus, in combination, a series of movably supported machine type blocks, mechanism actuated through keys for throwing individual selected blocks into operative position in an assembled line, automatic mechanism for temporarily retaining each of said blocks in operative position, a movable chase embodying apertures in line with the assembled type blocks and carrying a line of removable type distinct from the line of said type blocks, a movable platen, a record strip extending and adapted to travel across the face of the platen, an inking ribbon extending and adapted to travel across the openings in the movable chase but not across the distinct line of removable type, an inking ribbon extending and adapted to travel across the platen and over both the openings in the movable chase and the line of movable type, means for guiding a memorandum or sales slip to a position between the second inking ribbon and the face of the platen, and means for causing the chase to advance to a position in which the acting faces of the machine type blocks extend through its openings, and the contemporaneous movement of the platen to carry the papers and inking ribbon against the faces of the type blocks and removable types, and means for occasioning the advance of the record strip after the making of each impression, substantially as set forth.

8. In a sales recording apparatus, in combination, a series of movably supported machine type blocks, mechanism actuated through keys for throwing individual selected blocks into operative position in an assembled line, automatic mechanism for temporarily retaining each of said blocks in operative position, a movable chase embodying apertures in line with the assembled machine type blocks and carrying a line of removable type distinct from the line of said type blocks, a movable platen, a record strip extending and adapted to travel across the face of the platen, an inking ribbon extending and adapted to travel across the openings in the movable chase but not across the distinct line of removable type, an inking ribbon extending and adapted to travel across the platen and over both the openings in the movable chase and the line of movable types, means for guiding a memorandum or sales slip to a position between the second inking ribbon and the face of the platen, and means for causing the chase to advance to a position in which the acting faces of the machine type blocks extend through its openings, and the contemporaneous movement of the platen to carry the papers and inking ribbon against the faces of the type blocks and removable types, means for occasioning the advance of the record strip after the making of each impression, and means for occasioning the advance of the inking ribbons after the making of each impression, substantially as set forth.

9. In a sales recording apparatus, in combination, a series of movably supported machine type blocks, mechanism actuated through keys for throwing individual selected blocks into operative position in an assembled line, automatic mechanism for temporarily retaining each of said blocks in operative position, a movable chase embodying apertures in line with the assembled type blocks and carrying a line of removable type distinct from the line of said type blocks, a movable platen, a record strip extending and adapted to travel across the face of the platen, an inking ribbon extending and adapted to travel across the openings in the movable chase but not across the distinct line of removable type, an inking ribbon extending and adapted to travel across the platen and over both the openings in the movable chase and the line of movable types, means for guiding a memorandum or sales slip to a position between the second inking ribbon and the face of the platen, and means for causing the chase to advance to a position in which the acting faces of the type blocks extend through its openings, and the contemporaneous movement of the platen to carry the papers and inking ribbon against the faces of the type blocks and removable types, means for occasioning the advance of the record strip after the making of each impression, means for occasioning the advance of the inking ribbons after the making of each impression, and means for distributing or scattering the type blocks after the making of each impression, substantially as set forth.

10. In a sales recording apparatus, a series of machine type blocks, pivotally connected to a suitable support, each provided with a shoulder and each adapted to be tilted with respect to its pivotal connection into operative position facing a movable platen arranged to be moved toward the selected type blocks to occasion the making of an impression, a supporting bar upon which rest the shoulders of the type blocks tilted into operative position, a series of keys mounted in a key board and adapted to be depressed, connections between said keys and type blocks through which the depression of a key occasions the tilting of a key into operative position, substantially as set forth.

11. In a sales recording apparatus, a series of machine type blocks, pivotally connected to a suitable support, each provided with a shoulder and each adapted to be tilted with respect to its pivotal connection into operative position facing a movable platen arranged to be moved toward the selected type blocks to occasion the making of an impression, a supporting bar upon which rest the shoulders of the type blocks tilted into operative position, a series of keys mounted in a key board and adapted to be depressed, connections between said keys and type blocks through which the depression of a key occasions the tilting of a key into operative position, and means for temporarily securing depressed keys in depressed position, substantially as set forth.

12. In a sales recording apparatus, a series of machine type blocks pivotally mounted, a number of said blocks being mounted upon one, and the remainder upon another, of two parallel bars, said blocks being adapted to be tilted on their pivotal connections into operative positions facing a movable platen arranged to be moved toward said type to occasion the making of an impression, a series of keys arranged in a key board and adapted to be depressed, connections between said keys and machine type blocks through which the depression of a key occasions the tilting of the corresponding type block into operative position, a series of spring tongues depending one from each of the keys and adapted in the depression of the keys to engage with a suitable retaining device, substantially as set forth.

13. In a sales recording apparatus, a series of machine type blocks pivotally connected to suitable supports and adapted to be tilted on their pivotal connections into operative position facing a movable platen arranged to be moved toward said type to occasion the making of an impression, a series of keys arranged in a key board and adapted to be depressed, against the stress of suitable springs, connections between said keys and machine type blocks through which the depression of a key occasions the tilting of the corresponding type blocks into operative position, a series of barbed spring tongues depending one from each of the keys, a grid with which the spring tongues of depressed keys are adapted to engage or latch, and means for releasing said tongues from said grid, substantially as set forth.

14. In a sales recording apparatus, a series of machine type blocks pivotally mounted partly upon one and partly upon another of a pair of parallel bars and adapted to be tilted on their pivotal connections into operative position facing a movable platen arranged to be moved toward said type to occasion the making of an impression, a series of keys arranged in a key board and adapted to be depressed against the stress of suitable springs, connections between said keys and machine type blocks through which the depression of a key occasions the tilting of the corresponding type block into operative position, a series of barbed spring tongues depending one from each of the keys, a grid with which the barbs of the spring tongues of depressed keys engage or latch, and means for moving said grid to release said tongues to permit the rise of the keys and the retilting return or distribution of the type blocks, substantially as set forth.

15. In a sales recording apparatus, a series of machine type blocks pivotally connected to suitable supports and adapted to be tilted on their pivotal connections into operative position facing a movable platen arranged to be moved toward said type to occasion the making of an impression, a series of keys arranged in a key board and adapted to be depressed against the stress of suitable springs, connections between said keys and type blocks through which the depression of a key occasions the tilting of the corresponding type block into operative position, a series of barbed spring tongues depending one from each of the keys, a grid with which the barbs of the spring tongues of depressed keys engage or latch, an apertured fixed plate in the apertures of which the lower ends of the spring tongues of depressed keys enter, and means for moving said grid to release said tongues to permit the rise of the keys and the retilting return or distribution of the type blocks, substantially as set forth.

16. In a sales recording apparatus, in combination, a series of machine type blocks arranged in two rows and pivotally connected to suitable supports and adapted to be tilted on their pivotal connections into an intermediate position facing a movable platen arranged to be moved toward said blocks to occasion the making of an impression, a series of keys arranged in tiers, connections between individual keys and individual type blocks through which depression of a key occasions the tilting of a corresponding type block, means for securing type blocks in operative position, a movable chase interposed between the type blocks and the platen and embodying a number of apertures corresponding to the number of tiers of keys, the arrangement being such that the type blocks connected with the keys of a tier are all arranged in a group in the vicinity of the opening in the chase corresponding to the tier of keys controlling said group, a deflecting plate forming guide ways leading to central guide waists or throats, which waists are each of such size as to admit one type block and are situated respectively beneath the respective openings in the chase, the two outer openings of each of said guide ways being large enough to receive any one of the type blocks of a group and guide it in its tilting movement to said guide waist, substantially as set forth.

17. In a sales recording apparatus, in combination, a series of machine type blocks pivotally connected to suitable supports, and adapted to be tilted on their pivotal connections into operative position facing a movable platen arranged to be moved toward said blocks to occasion the making of an impression, a series of keys arranged in tiers, connections between individual keys and individual type blocks through which depression of a key occasions the tilting of a corresponding type block into operative position, the arrangement being such that the type blocks connected with the keys of a tier are all arranged in a group, a series of cipher blocks corresponding in number to the number of groups of type blocks, said cipher blocks being mounted each in connection with one of the groups of type blocks and arranged normally in operative position, means by which the movement of a machine type block into operative position throws out of operative position the cipher block connected with the group of which said machine type block is a member, substantially as set forth.

18. In a sales recording apparatus, in combination, a series of machine type blocks, arranged in two rows and each pivotally supported, thrust bars one connected to each of said type blocks, a series of keys corresponding to the number of thrust bars and each so connected with a thrust bar that its depression occasions the longitudinal movement of said bar, and the consequent tilting of the connected type block, a rest bar adapted to be encountered by a type block when said block is tilted into operative position, and means for temporarily securing the keys in depressed position, substantially as set forth.

19. In a sales recording apparatus, in combination, a series of machine type blocks, arranged in two rows and each pivotally supported, thrust bars one connected to each of said type blocks, a series of keys corresponding to the number of thrust bars, and each connected to its thrust bar by a bell crank lever, with the result that the depression of a key occasions the longitudinal movement of its thrust bar and the tilting of the associated type block into operative position intermediate of the two rows of type blocks, springs which constantly tend to elevate said keys, and means for temporarily securing the type blocks in operative position, substantially as set forth.

20. In a sales recording apparatus, in combination, a series of machine type blocks arranged in two rows and each pivotally supported, thrust bars one connected to each of said type blocks, a series of keys corresponding to the number of the type blocks and thrust bars and each so connected to a thrust bar that its depression occasions the longitudinal movement of said bar and the consequent tilting of its type block into operative position intermediate of the two rows of type blocks, means for temporarily securing said type blocks in operative position, means for taking an ink impression from said type blocks, cipher blocks normally in operative position, a connection between said cipher blocks and the thrust bars through which movement of a thrust bar to tilt a type block into operative position occasions the movement of a cipher block out of operative position, substantially as set forth.

21. In a sales recording apparatus, in combination, the pivotally supported machine type blocks arranged in two rows, and normally out of operative position, the two series of thrust bars, a series of keys operatively connected with said thrust bars, a series of cipher blocks pivotally supported and normally pressed by springs into operative position with acting faces intermediate of the two rows of type blocks and beneath a movable platen, bars connected to said cipher blocks, extending in parallelism with the thrust bars and provided with feet extending transversely between the two series of thrust bars, and projections mounted on said thrust bars adapted to encounter said feet, substantially as set forth.

22. In a sales recording apparatus, in combination, the pivotally supported machine type blocks, arranged in two rows and normally out of operative position, two series of thrust bars, a series of keys operatively connected with said thrust bars, a series of cipher blocks pivotally supported and normally presenting their acting faces in a position intermediate of the two rows of type blocks, a movable chase, having openings, supported above said type blocks, and adapted to be caused to descend so that type blocks in operative position project through said openings, means for taking an impression from type blocks projecting through said openings in said chase,—bars connected to the cipher blocks and provided with feet extending transversely with respect to the thrust bars, and projections mounted on said thrust bars and adapted to encounter said feet, substantially as set forth.

23. In a sales recording apparatus, in combination, the pivotally supported machine type blocks, the thrust bars connected therewith, and keys connected with said bars, the depression of which keys occasions the tilting or throwing of said type blocks, means for securing the type blocks in tilted operative position, the movable chase, the deflecting plates forming guide ways, and means for taking an impression from the type blocks assembled in operative position, substantially as set forth.

24. In a sales recording apparatus, in combination with a series of machine type blocks and key controlled mechanism for assembling them, a movable grid with which the keys manipulated in the assembling of the type blocks engage, to secure the selected type blocks in assembled position, and the movement of which occasions the release of said keys,—a movable chase provided with openings in alinement with the assembled blocks, a movable platen supported above said chase, a record strip extending across the face of the platen, an inking ribbon extending across the openings in the movable chase, and a lever the movement of which occasions the descent of the platen causing it to encounter and depress the movable chase until the type blocks extend through the openings therein and bear against the inking ribbon record strip and platen, and mechanism through which movement of the movable chase occasions or permits movement of the grid to release the keys, substantially as set forth.

25. In a sales recording apparatus, in combination with a series of machine type blocks and key controlled mechanism for assembling selected blocks and retaining them in assembled position, a movable grid with which depressed keys engage to retain selected blocks in assembled position, a movable chase provided with openings in alinement with the assembled blocks, a movable platen supported above said chase, a record strip extending across the face of the platen, an inking ribbon extending across the openings in the chase, a lever the movement of which occasions the descent of the platen causing it to encounter and depress the movable chase until the type blocks extend through the openings therein and bear against the inking ribbon record strip and platen, a movable bar adapted to engage the grid, a bar depending from the chase, and a bell crank lever connective of said movable bar and depending bar, substantially as set forth.

26. In a sales recording apparatus, in combination with a series of machine type blocks and key controlled mechanism for assembling selected blocks and retaining them in assembled position, a movable grid with which depressed keys engage to retain selected blocks in assembled position, a movable chase provided with openings in alinement with the assembled blocks, a movable platen supported above said chase, a record strip extending across the face of the platen, an inking ribbon extending across the openings in the chase, a lever the movement of which occasions the descent of the platen causing it to encounter and depress the movable chase until the type blocks extend through the openings therein and bear against the inking ribbon record strip and platen, a movable bar having a barb adapted to be engaged by a barbed spring tongue connected to the grid, a spring which normally thrusts said bar away from said spring tongue, a bar depending from the chase, and a bell crank lever connective of said movable bar and depending bar, substantially as set forth.

27. In a sales recording apparatus, in combination with a series of machine type blocks and key controlled mechanism for assembling selected blocks and retaining them in assembled position, a movable grid with which depressed keys engage to retain selected blocks in assembled position, a movable chase provided with openings in alinement with the assembled blocks, a movable platen supported above said chase, a record strip extending across the face of the platen, an inking ribbon extending across the openings in the chase, a lever the movement of which occasions the descent of the platen causing it to encounter and depress the movable chase until the type blocks extend through the openings therein and bear against the inking ribbon record strip and platen, a movable bar having a barb adapted to be engaged by a barbed spring tongue connected to the grid, a spring which normally thrusts said bar away from said spring tongue, a bar depending from the chase, and a bell crank lever connective of said movable bar and depending bar, the arrangement being such that the chase as it descends, causes, through the bell crank, the movement of the movable bar to a position in which it is engaged by the barb of the spring tongue, and, as said chase rises, the spring causes the movement of the movable bar and of the grid, substantially as set forth.

28. In a sales recording apparatus, in combination with a series of machine type blocks and key controlled mechanism for assembling selected blocks and retaining them in assembled position, a movable grid with which depressed keys engage to retain selected blocks in assembled position, a movable chase provided with openings in alinement with assembled blocks, a movable platen supported above said chase, a record strip extending across the face of the platen, an inking ribbon extending across the openings in the chase, a lever the movement of which occasions the descent of the platen causing it to encounter and depress the movable chase until the type blocks extend through the openings therein and bear against the inking ribbon record strip and platen, a movable bar having a barb adapted to be engaged by a barbed spring tongue connected to the grid, a spring which normally thrusts said bar away from said spring tongue, a bar depending from the chase, and a bell crank lever connective of said movable bar and depending bar, the arrangement being such that as the chase descends it through the bell crank causes the movement of the movable bar to a position in which it is engaged by the barb of the spring tongue, and, as said chase rises, the spring causes the movement of the movable bar and of the grid, and means for disengaging the spring tongue from the movable bar, substantially as set forth.

29. In a sales recording apparatus, in combination with the machine type blocks, key controlled mechanism for assembling them, the movable grid with which the depressed keys engage, the mechanism for taking an impression from assembled type blocks, and the movable chase, a barbed spring tongue connected to the grid, a movable slide bar having a barb adapted to be engaged by said spring tongue, a bell crank lever connected to said slide bar, a bar depending from the movable chase and arranged in sliding engagement with the bell crank lever, substantially as set forth.

30. In a sales recording apparatus, in combination with the machine type blocks, key controlled mechanism for assembling them, the movable grid with which the depressed keys engage, the mechanism for taking an impression from assembled type blocks, and the movable chase, a barbed spring tongue connected to the grid, a slide bar having a barb or projection adapted to be engaged by said spring tongue, a projection adapted to be encountered by the head of said spring tongue, a bell crank lever connected to said slide bar, a bar depending from the movable chase and arranged in sliding engagement with the bell crank lever, substantially as set forth.

31. In a sales recording apparatus, in combination with the machine type blocks, key controlled mechanism for assembling them, the movable grid with which the depressed keys engage, the mechanism for taking an impression from the assembled type blocks, the movable chase, a barbed spring tongue connected to the grid, a spring controlled slide bar having a barb or projection adapted to be engaged by said spring tongue a projection adapted to be encountered by the head of said spring tongue, a bell crank lever connected to said slide bar, a slotted bar depending from the movable chase, a wrist pin on the bell crank lever mounted in said slot, substantially as set forth.

32. In a sales recording apparatus, in combination with the machine type blocks, key controlled mechanism for assembling them, the movable grid with which the depressed keys engage, the mechanism for taking an impression from the assembled type blocks, the movable chase, a barbed spring tongue connected to the grid, a spring controlled slide bar having a barb or projection adapted to be engaged by said spring tongue, a projection adapted to be encountered by the head of said spring tongue, a bell crank lever connected to said slide bar, a slotted bar depending from the movable chase, a wrist pin on the bell crank lever mounted in said slot, a spring controlled pawl having a shoulder or hook adapted to engage said wrist pin, and having a deflecting head, and a stud mounted on the depending bar and adapted in the movement of said bar to encounter said head and occasion the disengagement of the pawl from the wrist pin, substantially as set forth.

33. In a sales recording apparatus, in combination with a series of machine type blocks and mechanism for assembling selected blocks and retaining them temporarily in assembled position, a chase provided with depending legs, hollow sockets erected from the floor of the frame work of the apparatus, in the bores of which sockets the legs of said chase are entered, springs mounted in said bores, openings in said chase in alinement with the assembled type blocks, a movable platen supported above said chase, a record strip extending across the face of the platen, an inking ribbon extending across the openings in the chase, and a lever the throw of which occasions the descent of the platen causing it to encounter and depress the movable chase until the type blocks extend through the openings therein and bear against the inking ribbon record strip and platen, substantially as set forth.

34. In a sales recording apparatus, in combination, a series of machine type blocks and mechanism for assembling said blocks and retaining them in assembled position, a movable chase provided with openings in alinement with the assembled blocks, a platen, a lever from which said platen is suspended by links, a pivotal connection between said lever and the framework of the apparatus, a rock shaft having a wrist plate with which said lever is connected, a spring the stress of which tends to retain said rock shaft in such position that the platen is above the chase, a lever for occasioning the throw of said shaft and the descent of the platen, substantially as set forth.

35. In a sales recording apparatus, in combination, a series of machine type blocks, and mechanism for assembling selected type blocks and retaining them in assembled position, a platen, an inking ribbon and a record strip interposed between said type blocks and said platen, means for causing the approach of the platen and type blocks to take an impression, a reciprocating slide bar operated by a moving part of the apparatus, a roll or spool for the record strip, a pair of ears loosely mounted on the spindles of the roll or spool, a slot bar mounted in said ears, a ratchet wheel mounted on one of said spindles, a pawl carried by one of said ears and engaged in said ratchet wheel, and a mechanical connection between the reciprocating slide bar and said slot bar, substantially as set forth.

36. In a sales recording apparatus, in combination, a series of machine type blocks, and mechanism for assembling selected type blocks and retaining them in assembled position, a platen, an inking ribbon and a record strip interposed between said type blocks and said platen, means for causing the approach of the platen and type blocks to take an impression, a reciprocating slide bar operated by a moving part of the apparatus, a roll or spool for the record strip, a pair of ears loosely mounted on the spindles of the roll or spool and each embodying a tangential slot, a slot bar mounted in said slots, a ratchet wheel mounted on one of said spindles, a pawl carried by one of said ears and engaged in said ratchet wheel, and a mechanical connection between said slot bar and the reciprocating slide bar, substantially as set forth.

37. In a sales recording apparatus, in combination, a series of machine type blocks, and mechanism for assembling selected type blocks and retaining them in assembled position, a platen, an inking ribbon and a record strip interposed between said type blocks and said platen, means for causing the approach of the platen and type blocks to take an impression, a reciprocating slide bar operated by a moving part of the apparatus, a roll or spool for the record strip, a pair of ears loosely mounted on the spindles of the roll or spool and each embodying a tangential slot, a slot bar mounted in said slots, a ratchet wheel mounted on one of said spindles, a pawl carried by one of said ears and engaged in said ratchet wheel, a pair of upright oscillatory bars suitably connected and pivotally attached to the base of the apparatus, links connecting the slot bar to said oscillatory bars, and a link connecting one of said oscillatory bars to the reciprocating slide bar, substantially as set forth.

38. In a sales recording apparatus, in combination, a series of machine type blocks, mechanism for assembling selected type blocks and retaining them in assembled position, a platen, an inking ribbon and a record strip interposed between said type blocks and said platen, a rock shaft, a lever operatively connected with a wrist plate mounted on said rock shaft from which lever said platen is suspended, so that the partial rotation of said rock shaft occasions the descent of the platen and the making of an impression, a reciprocating slide bar, a bell crank lever one arm of which engages said slide bar and the other is encountered by a projection carried by said rock shaft, and means for transmitting motion from said slide bar to the record strip and the inking ribbon, substantially as set forth.

39. In a sales recording apparatus, in combination, a series of machine type blocks, mechanism for assembling selected type blocks and retaining them in assembled position, a platen, an inking ribbon and a record strip interposed between said type blocks and said platen, a rock shaft, a lever operatively connected with a wrist plate mounted on said rock shaft from which lever said platen is suspended, so that the partial rotation of said rock shaft occasions the descent of the platen and the making of an impression, a spring controlled reciprocating slide bar, a bell crank lever one arm of which engages said slide bar and the other is encountered by a projection carried by said rock shaft, and means for transmitting motion from said slide bar to various operative parts of the apparatus, substantially as set forth.

40. In a sales recording apparatus, in combination, a series of machine type blocks, and mechanism for assembling selected type blocks and retaining them in assembled position, a movable chase having openings in alinement with the assembled type blocks, a platen, a record strip and an inking ribbon interposed between said platen and said chase, means for causing the descent of the platen and chase upon the type blocks to take an impression, means for causing the advance of the record strip after each impression, a pair of spools upon which the respective extremities of the inking ribbon are wound, a pair of slots in the movable chase through which the inking ribbon travels, and means for occasioning the rotation of the inking ribbon spools after the making of each impression, substantially as set forth.

41. In a sales recording apparatus, in combination, a casing a series of machine type blocks, mechanism for assembling selected type blocks and retaining them in assembled position, a movable chase having openings in alinement with the assembled type blocks, and having a line of removable type supported upon it, a platen, a record strip interposed between said platen and said chase, an inking ribbon extending over the openings in the chase but not over the removable type mounted therein, a second inking ribbon passing above the record strip and overlying both the openings in the chase and the movable type mounted thereon, a slot in the casing adapted to permit the entrance and removal of a sales or memorandum slip, a guide to conduct an entering slip to a position between the second inking ribbon and the platen, means for causing the descent of the platen and the chase to cause the type blocks to print upon the record strip and the type blocks and removable type to print upon the sales slip, and means for automatically advancing the record strip and inking ribbons, substantially as set forth.

42. In a printing or recording apparatus, in combination with mechanism for printing upon a strip of paper, a spool upon which said paper is wound, a ratchet wheel mounted on the axle or spindle of said spool, an ear loosely mounted on the axle or spindle of said spool and provided with a pawl adapted to engage with said ratchet, a link through which traction is exerted upon said ear to occasion the rotation of the spool, as a means for connecting said link to said ear, a tangential slot formed in the latter, and a slot bar connected to said link, and engaged in said slot, substantially as set forth.

In testimony that I claim the foregoing as my invention, I have hereunto signed my name this 17th day of January, A. D. 1896.

FRANKLIN N. BREWER.

In the presence of—
F. NORMAN DIXON,
THOS. K. LANCASTER.